US012230907B2

(12) United States Patent
Kimura

(10) Patent No.: US 12,230,907 B2
(45) Date of Patent: Feb. 18, 2025

(54) ELECTRICAL CONNECTOR FOR CONNECTING AN ELECTRIC WIRE TO A FLAT FLEXIBLE CONDUCTOR AND AN ELECTRICAL CONNECTOR ASSEMBLY THEREFOR

(71) Applicant: Japan Aviation Electronics Industry, Limited, Tokyo (JP)

(72) Inventor: Akira Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 389 days.

(21) Appl. No.: 17/839,045

(22) Filed: Jun. 13, 2022

(65) Prior Publication Data

US 2023/0028291 A1 Jan. 26, 2023

(30) Foreign Application Priority Data

Jul. 14, 2021 (JP) ................................ 2021-116150

(51) Int. Cl.
*H01R 13/422* (2006.01)
*H01R 4/2425* (2018.01)
(Continued)

(52) U.S. Cl.
CPC ......... *H01R 13/422* (2013.01); *H01R 4/2425* (2013.01); *H01R 4/2491* (2013.01);
(Continued)

(58) Field of Classification Search
CPC .. H01R 13/422; H01R 4/2425; H01R 4/2491; H01R 4/26; H01R 11/05; H01R 12/63; H01R 12/67; H01R 13/506; H01R 4/24; H01R 4/242; H01R 4/2429; H01R 4/2433; H01R 4/247; H01R 4/28; H01R 4/48;
(Continued)

(56) References Cited

U.S. PATENT DOCUMENTS 11,121,479 B2 * 9/2021 Komoto ................ H01R 24/20
2018/0233854 A1 8/2018 Komoto et al.

FOREIGN PATENT DOCUMENTS

JP 2018129244 A 8/2018

* cited by examiner

*Primary Examiner* — Justin M Kratt
(74) *Attorney, Agent, or Firm* — MUNCY, GEISSLER, OLDS & LOWE, P.C.

(57) ABSTRACT

A contact is accommodated in a contact accommodating portion of a second insulator, an end portion of an electric wire is accommodated in an opened electric-wire-end-portion accommodating portion of a projection of a first insulator, the projection is accommodated in a projection accommodating portion of a contact with a flexible conductor being sandwiched therebetween and such that the opened electric-wire-end-portion accommodating portion is opposed to an electric-wire connection piece of the contact, the electric wire extends from the electric-wire-end-portion accommodating portion and makes contact with an electric-wire contact portion of the electric-wire connection piece of the contact, and a part of the flexible conductor is sandwiched between an outer surface of the projection and a conductor contact piece of the contact and makes contact with the conductor contact piece of the contact, whereby the electric wire is electrically connected to the flexible conductor via the contact.

28 Claims, 22 Drawing Sheets

(51) Int. Cl.

| | |
|---|---|
| ***H01R 4/2491*** | (2018.01) |
| ***H01R 4/26*** | (2006.01) |
| ***H01R 11/05*** | (2006.01) |
| ***H01R 12/63*** | (2011.01) |
| ***H01R 12/67*** | (2011.01) |
| ***H01R 13/506*** | (2006.01) |
| *H01R 4/24* | (2018.01) |
| *H01R 4/242* | (2018.01) |
| *H01R 4/2429* | (2018.01) |
| *H01R 4/2433* | (2018.01) |
| *H01R 4/247* | (2018.01) |
| *H01R 4/28* | (2006.01) |
| *H01R 4/48* | (2006.01) |
| *H01R 12/59* | (2011.01) |
| *H01R 13/40* | (2006.01) |
| *H01R 13/405* | (2006.01) |
| *H01R 13/42* | (2006.01) |
| *H01R 13/502* | (2006.01) |
| *H01R 13/504* | (2006.01) |

(52) U.S. Cl.

CPC ............... *H01R 4/26* (2013.01); *H01R 11/05* (2013.01); *H01R 12/63* (2013.01); *H01R 12/67* (2013.01); *H01R 13/506* (2013.01); *H01R 4/24* (2013.01); *H01R 4/242* (2013.01); *H01R 4/2429* (2013.01); *H01R 4/2433* (2013.01); *H01R 4/247* (2013.01); *H01R 4/28* (2013.01); *H01R 4/48* (2013.01); *H01R 12/59* (2013.01); *H01R 12/675* (2013.01); *H01R 13/40* (2013.01); *H01R 13/405* (2013.01); *H01R 13/42* (2013.01); *H01R 13/502* (2013.01); *H01R 13/504* (2013.01); *H01R 13/5045* (2013.01)

(58) Field of Classification Search

CPC ...... H01R 12/59; H01R 12/675; H01R 13/40; H01R 13/405; H01R 13/42; H01R 13/502; H01R 13/504; H01R 13/5045

See application file for complete search history.

ELECTRICAL CONNECTOR FOR CONNECTING AN ELECTRIC WIRE TO A FLAT FLEXIBLE CONDUCTOR AND AN ELECTRICAL CONNECTOR ASSEMBLY THEREFOR

BACKGROUND OF THE INVENTION

The present invention relates to a connector and a connector assembly, particularly to a connector for connecting an electric wire to a sheet-like flexible conductor.

In recent years, attention has been drawn to so-called smart clothes that can obtain user's biological data such as the heart rate and the body temperature only by being worn by the user. Such smart clothes are equipped with a flexible conductor disposed at a measurement position and using conductive fibers, conductive printing or the like, and when a wearable device serving as a measurement device is electrically connected to the flexible conductor, this makes it possible to send biological data to the wearable device.

As a connector useful for connecting a wearable device to a flexible conductor, for instance, JP 2018-129244 A discloses a connector shown in FIG. 52. This connector includes a contact 2 and a base member 3 that are disposed on the opposite sides across a flexible substrate 1 to sandwich the flexible substrate 1 therebetween.

A flexible conductor 4 is exposed on the flexible substrate 1 on the side facing the contact 2, the contact 2 has a projection accommodating portion 5 of concave shape formed to face the flexible conductor 4, and a projection 6 is formed on the base member 3 to project toward the bottom of the flexible substrate 1. When the projection 6 of the base member 3 is, together with the flexible substrate 1, inserted into the projection accommodating portion 5 of the contact 2 with the flexible substrate 1 being sandwiched between the projection 6 and the contact 2 such that the projection 6 is covered with the flexible substrate 1, the flexible substrate 1 is pressed against the inner surface of the projection accommodating portion 5 of the contact 2 by the projection 6, and the inner surface of the projection accommodating portion 5 makes contact with the flexible conductor 4 exposed on the front surface of the flexible substrate 1 with a predetermined contact force, whereby the contact 2 is electrically connected to the flexible conductor 4.

When a wearable device is fitted with the connector disclosed in JP 2018-129244 A, the wearable device can be connected to the flexible conductor.

However, in the case where a wearable device is disposed apart from a measurement position, it is necessary to constitute an electrical path from an attachment position of the connector to the measurement position, and when such an electric path is formed by the flexible conductor, electric resistance becomes high, and cost increases.

To cope with it, in order to connect a flexible conductor disposed at a measurement position and a wearable device by an inexpensive electric wire with low electric resistance, the development of a small-sized connector for connecting an electric wire to a flexible conductor disposed on a garment is desired.

SUMMARY OF THE INVENTION

The present invention has been made to solve the conventional problems described above and aims at providing a small-sized connector capable of connecting an electric wire to a flexible conductor.

The present invention also aims at providing a connector assembly in which a flexible conductor and an electric wire are connected with each other by means of the connector.

A connector according to the present invention is one for connecting an electric wire to a flexible conductor having a sheet-like shape and including a first surface and a second surface facing in opposite directions to each other, the connector comprising:

a housing which is attached to the flexible conductor and holds an end portion of the electric wire; and a contact which is made of a conductive material and accommodated in the housing, the housing including:

a first insulator which is disposed on the first surface of the flexible conductor; and a second insulator which is disposed on the second surface of the flexible conductor and attached to the first insulator along a first direction which is a thickness direction of the flexible conductor, wherein the first insulator includes a projection projecting in the first direction toward the second insulator, the projection including an electric-wire-end-portion accommodating portion opening in a second direction intersecting the first direction, wherein the second insulator includes a contact accommodating portion which is recessed in the first direction and accommodates the contact, wherein the contact includes a plurality of side wall portions extending in the first direction, and a projection accommodating portion which is surrounded by the plurality of side wall portions and recessed in the first direction, wherein the plurality of side wall portions include at least one side wall portion formed from an electric-wire connection piece having at a tip thereof in the first direction an electric-wire contact portion which makes contact with the electric wire, and at least one side wall portion formed from a conductor contact piece which makes contact with the flexible conductor, wherein the contact is accommodated in the contact accommodating portion, the end portion of the electric wire is accommodated in the electric-wire-end-portion accommodating portion of the projection, and the projection is accommodated in the projection accommodating portion of the contact such that the flexible conductor is sandwiched therebetween and that the electric-wire-end-portion accommodating portion opening in the second direction is opposed to the electric-wire connection piece, and wherein the electric wire extends in the second direction from the electric-wire-end-portion accommodating portion and makes contact with the electric-wire contact portion of the electric-wire connection piece of the contact, and a part of the flexible conductor is sandwiched between an outer surface of the projection and the conductor contact piece of the contact and makes contact with the conductor contact piece of the contact, whereby the electric wire is electrically connected to the flexible conductor via the contact.

A connector assembly according to the present invention comprises:

the flexible conductor;

the connector which is attached to the flexible conductor; and the electric wire which is electrically connected to the flexible conductor via the contact by means of the connector.

DETAILED DESCRIPTION OF THE INVENTION

Embodiments of the present invention are described below with reference to the accompanying drawings.

Embodiment 1

Figure 1:
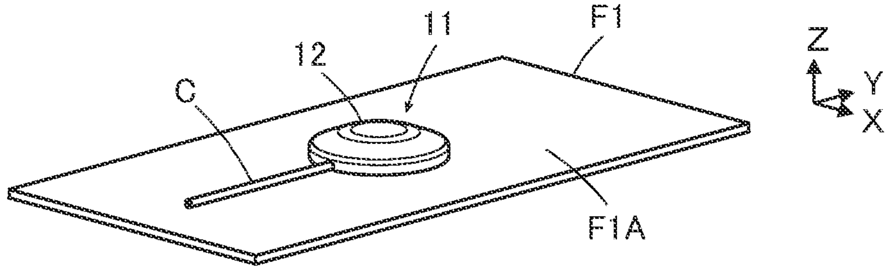
FIG. 1 is a perspective view showing a connector assembly according to Embodiment 1 when viewed from an obliquely upper position.
Figure 2:
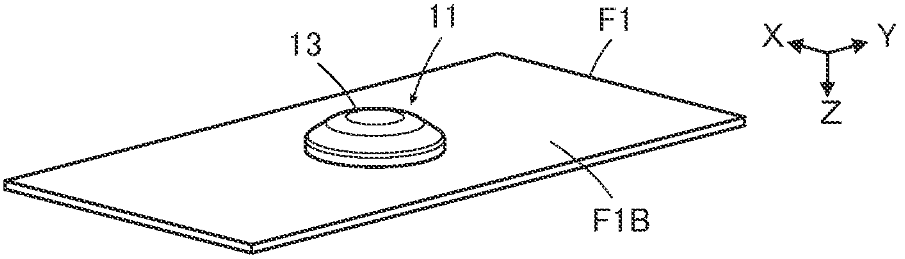
FIG. 2 is a perspective view showing the connector assembly according to Embodiment 1 when viewed from an obliquely lower position.

FIGS. 1 and 2 show a connector assembly according to Embodiment 1. This connector assembly is obtained by connecting an electric wire C to a flexible conductor F1 by means of a connector 11. The flexible conductor F1 is, for example, a conductor formed of twisted conductive fibers and having a pad shape extending in a sheet-like shape over a predetermined area, and has a first surface F1A and a second surface F1B facing in the opposite directions from each other.

The connector 11 is attached to the flexible conductor F1 and includes a first insulator 12 disposed on the first surface F1A of the flexible conductor F1 and a second insulator 13 disposed on the second surface F1B of the flexible conductor F1.

The electric wire C connected to the flexible conductor F1 extends on and along the first surface F1A of the flexible conductor F1, and an end portion of the electric wire C is inserted into the connector 11 through the first insulator 12.

For ease of understanding, a plane along which the flexible conductor F1 extends is called "XY plane," a thickness direction of the flexible conductor F1 from the second surface F1B to the first surface F1A of the flexible conductor F1 "+Z direction," and a direction in which the electric wire C extends on the first surface F1A of the flexible conductor F1 toward the connector 11 "+Y direction."

Figure 3:
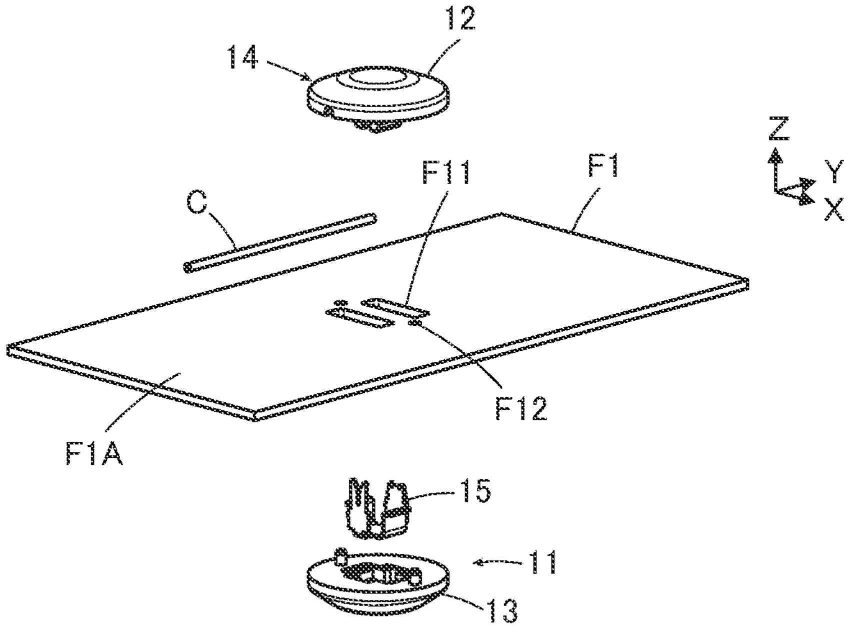
FIG. 3 is an assembly view of the connector assembly according to Embodiment 1.

FIG. 3 is an assembly view of the connector assembly according to Embodiment 1. At a center portion of the flexible conductor F1, two long holes F11 (opening portions) are formed to extend in the X direction and to be spaced apart from each other in the Y direction, and two round holes F12 are formed to be spaced apart from each other in the X direction with the two long holes F11 being sandwiched therebetween. These long holes F11 and round holes F12 penetrate the flexible conductor F1 in the Z direction.

The first insulator 12 and the second insulator 13 of the connector 11 are attached to each other to overlap in the Z direction with the flexible conductor F1 being sandwiched therebetween, thereby forming a housing 14. The connector 11 has a contact 15 accommodated in the housing 14.

A +Y directional end portion of the electric wire C is connected to the contact 15 in the housing 14.

Figure 4:
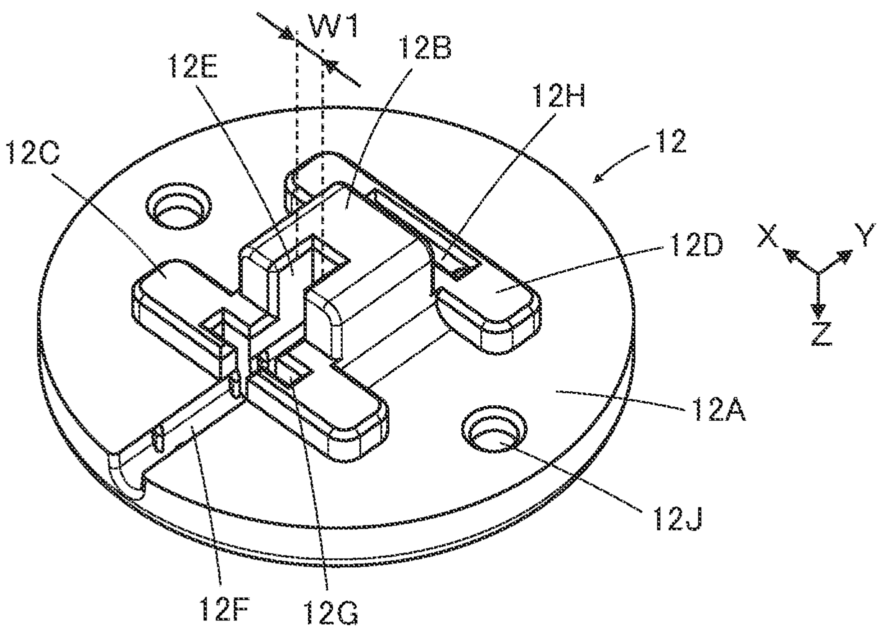
FIG. 4 is a perspective view showing a first insulator of a connector used in Embodiment 1.

As shown in FIG. 4, the first insulator 12 is made of an insulating material such as an insulating resin and includes a first holding surface 12A of circular shape extending in a flat shape along an XY plane and facing in the −Z direction and a projection 12B of quadrangular prism shape projecting in the −Z direction (first direction) from a center portion of the first holding surface 12A. On the first holding surface 12A, protruding portions 12C and 12D elongated in the X direction and protruding in the −Z direction are formed to be separately adjacent to the projection 12B on the −Y direction (second direction) side and the +Y direction side thereof. These protruding portions 12C and 12D are to be separately inserted into the two long holes F11 of the flexible conductor F1, separately extend longer in the −X direction and the +X direction than the projection 12B, and has a projection height lower than that of the projection 12B in the −Z direction.

The projection 12B is provided with an electric-wire-end-portion accommodating portion 12E of groove shape opening in the −Y direction and the −Z direction. The electric-wire-end-portion accommodating portion 12E is provided to accommodate the +Y directional end portion of the electric wire C to be connected to the flexible conductor F1 by means of the connector 11.

In addition, an electric-wire accommodating groove 12F extending in the Y direction and recessed in the +Z direction is formed in the protruding portion 12C adjacent to the projection 12B on the −Y direction side thereof and a part of the first holding surface 12A situated on the −Y direction side of the protruding portion 12C and communicates with the electric-wire-end-portion accommodating portion 12E.

Here, a width dimension W1 in the X direction of at least part of the electric-wire-end-portion accommodating portion 12E and the electric-wire accommodating groove 12F is designed to be slightly smaller than the outside diameter of the electric wire C. With this configuration, when the connector assembly is assembled, the electric wire C is pushed into the electric-wire-end-portion accommodating portion 12E and the electric-wire accommodating groove 12F, whereby the +Y directional end portion of the electric wire C and a part of the electric wire C continuing to the +Y directional end portion can be temporarily held in the electric-wire-end-portion accommodating portion 12E and the electric-wire accommodating groove 12F.

Note that the width dimension W1 in the X direction may be designed to be slightly smaller than the outside diameter of the electric wire C over the entirety of the electric-wire-end-portion accommodating portion 12E and the electric-wire accommodating groove 12F, or, at plurality of positions of inner wall surfaces of the electric-wire-end-portion accommodating portion 12E and the electric-wire accommodating groove 12F each having the width dimension larger than the outside diameter of the electric wire C, protrusions may be provided such that the width dimension becomes smaller than the outside diameter of the electric wire C, whereby the electric wire C can be temporarily held.

The protruding portions 12C and 12D are respectively provided with an electric-wire-connection-piece accommodating portion 12G of recess shape and a contact-holding-piece accommodating portion 12H of recess shape which extend in the X direction and are recessed in the +Z direction.

Further, in the first holding surface 12A, two pin insertion holes 12J recessed in the +Z direction are separately formed on opposite sides across the projection 12B in the X direction so as to sandwich the projection 12B.

Figure 5:
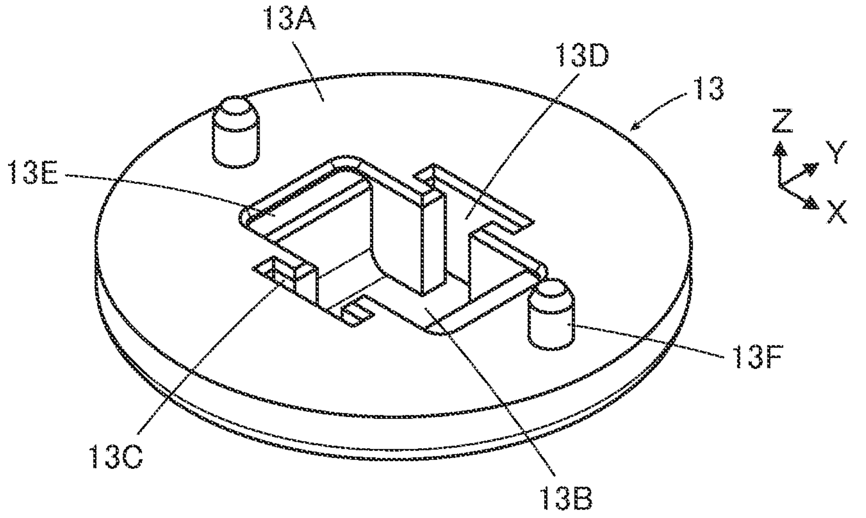
FIG. 5 is a perspective view showing a second insulator of the connector used in Embodiment 1.

As shown in FIG. 5, the second insulator 13 is made of an insulating material such as an insulating resin and includes a second holding surface 13A of circular shape extending in a flat shape along an XY plane and facing in the +Z direction and a contact accommodating portion 13B of recess shape recessed in the −Z direction from a center portion of the second holding surface 13A. An electric-wire-connection-piece holding portion 13C of recess shape and a contact-holding-piece holding portion 13D of recess shape which extend in the X direction and are recessed in the −Z direction from the second holding surface 13A are respectively formed on the −Y direction side and the +Y direction side of the contact accommodating portion 13B. These electric-wire-connection-piece holding portion 13C and contact-holding-piece holding portion 13D communicate with the contact accommodating portion 13B.

In addition, flange accommodating portions 13E each having a step shape recessed in the −Z direction and communicating with the contact accommodating portion 13B are separately formed at parts of the second holding surface 13A separately situated at a −X directional end portion and a +X directional end portion of the contact accommodating portion 13B.

Further, on the second holding surface 13A, two positioning pins 13F projecting in the +Z direction are separately formed on opposite sides across the contact accommodating portion 13B in the X direction so as to sandwich the contact accommodating portion 13B. The two positioning pins 13F are separately inserted into the two pin insertion holes 12J of the first insulator 12 through the two round holes F12 of the flexible conductor F1, whereby the first insulator 12 and the second insulator 13 are aligned with the flexible conductor F1.

Figure 6:
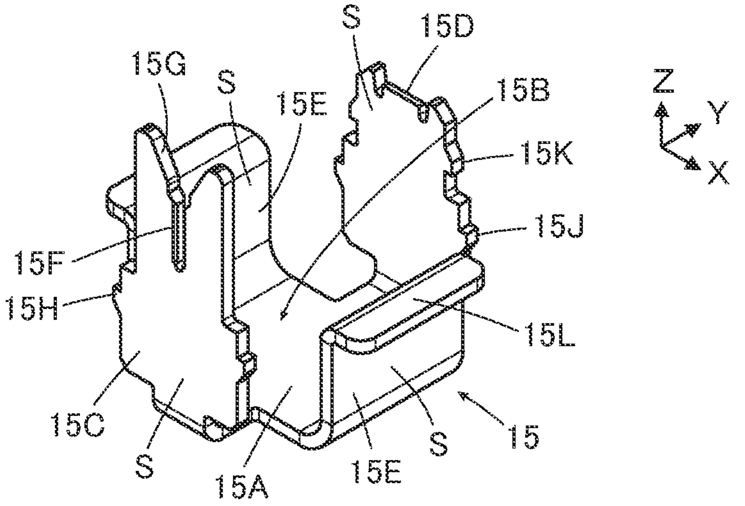
FIG. 6 is a perspective view showing a contact of the connector used in Embodiment 1.

As shown in FIG. 6, the contact 15 is formed of a conductive material, e.g., a single bent metal plate and includes a bottom plate portion 15A of rectangular shape and four side wall portions S extending in the +Z direction separately from four edge portions of the bottom plate portion 15A and separated from one another. In addition, the contact 15 includes a projection accommodating portion 15B formed by being surrounded by the bottom plate portion 15A and the four side wall portions S and recessed in the −Z direction.

Of the four side wall portions S, two side wall portions S facing each other in the Y direction constitute a first side wall pair, while two side wall portions S facing each other in the X direction constitute a second side wall pair. Further, of the two side wall portions S constituting the first side wall pair, a side wall portion S situated on the −Y direction side is formed from an electric-wire connection piece 15C, and a side wall portion S situated on the +Y direction side is formed from a contact holding piece 15D, while the two side wall portions S constituting the second side wall pair are each formed from a conductor contact piece 15E.

The conductor contact piece 15E has a Z direction height corresponding to a Z direction depth of the contact accommodating portion 13B of the second insulator 13, and the electric-wire connection piece 15C and the contact holding piece 15D extend longer than the conductor contact piece 15E in the +Z direction.

An electric-wire contact portion 15F composed of a slit extending in the Z direction is formed at a tip in the +Z direction of the electric-wire connection piece 15C. The electric-wire contact portion 15F is provided to make contact with the electric wire C, and a +Z directional end portion of the slit constitutes an opening end portion 15G communicating with the slit and opening in the +Z direction. The opening end portion 15G has a taper shape with its width in the X direction increasing in the +Z direction.

First press-fitted portions 15H projecting in the X direction are separately formed at opposite edge portions in the X direction of a part of the electric-wire connection piece 15C situated on the −Z direction side of the electric-wire contact portion 15F.

The contact holding piece 15D is provided to fix the contact 15 to the first insulator 12 and the second insulator 13.

Second press-fitted portions 15J projecting in the X direction are separately formed at opposite edge portions in the X direction of a middle part in the Z direction of the contact holding piece 15D, and third press-fitted portions 15K projecting in the X direction are separately formed at opposite edge portions in the X direction of a part of the contact holding piece 15D near a +Z directional end portion of the contact holding piece 15D.

The conductor contact piece 15E is provided to make contact with and be electrically connected to the flexible conductor F1, and a flange 15L extending out of the projection accommodating portion 15B and along an XY plane is formed at a +Z directional end portion of the conductor contact piece 15E.

Figure 7:
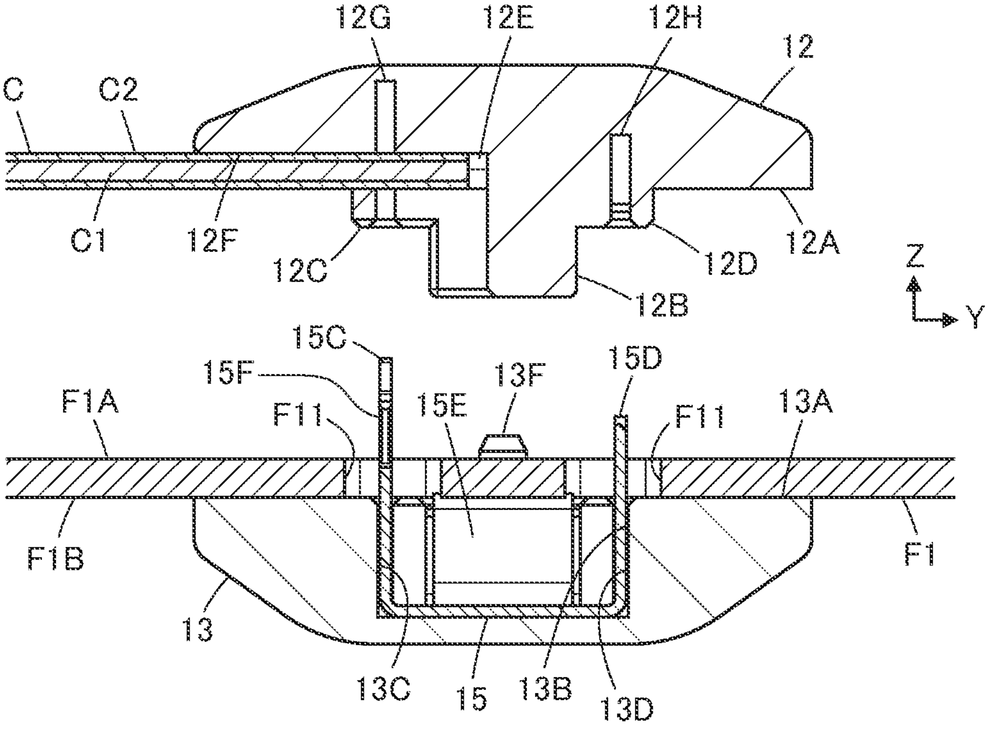
FIG. 7 is a cross-sectional side view of the connector assembly according to Embodiment 1 in the process of assembling.

Here, the method of assembling the connector assembly according to Embodiment 1 is described. First, as shown in FIG. 7, the contact 15 is accommodated in the contact accommodating portion 13B of the second insulator 13, and the flexible conductor F1 is positioned above the second holding surface 13A of the second insulator 13.

At this time, the electric-wire connection piece 15C and the contact holding piece 15D of the contact 15 are respectively pushed into the electric-wire-connection-piece holding portion 13C and the contact-holding-piece holding portion 13D of the second insulator 13, and the first press-fitted portions 15H of the electric-wire connection piece 15C and the second press-fitted portions 15J of the contact holding piece 15D shown in FIG. 6 are respectively press-fitted to an inner wall of the electric-wire-connection-piece holding portion 13C and an inner wall of the contact-holding-piece holding portion 13D, whereby the contact 15 is fixed to the contact accommodating portion 13B of the second insulator 13.

While the conductor contact piece 15E of the contact 15 has the Z direction height corresponding to the Z direction depth of the contact accommodating portion 13B of the second insulator 13, since the electric-wire connection piece 15C and the contact holding piece 15D extend longer than the conductor contact piece 15E in the +Z direction, the electric-wire connection piece 15C and the contact holding piece 15D of the contact 15 accommodated in the contact accommodating portion 13B project in the +Z direction from the second holding surface 13A of the second insulator 13.

However, the two positioning pins 13F of the second insulator 13 separately pass through the two round holes F12 of the flexible conductor F1 shown in FIG. 3 so that the second insulator 13 and the flexible conductor F1 are aligned with each other, and the electric-wire connection piece 15C and the contact holding piece 15D of the contact 15 separately pass through the two long holes F11 of the flexible conductor F1 and project on the +Z direction side of the flexible conductor F1.

In addition, the +Y directional end portion of the electric wire C is pushed into the electric-wire-end-portion accommodating portion 12E of the first insulator 12, and a part of the electric wire C continuing to the +Y directional end portion is pushed into the electric-wire accommodating groove 12F, whereby the electric wire C is temporarily held in the first insulator 12. The electric wire C is formed from a so-called coated conductive wire and has, for example, such a structure that an outer periphery of a conductor portion C1 obtained by twisting a plurality of thin conductive wires is covered with an insulating portion C2. The electric-wire contact portion 15F composed of the slit of the electric-wire connection piece 15C of the contact 15 shown in FIG. 6 has a slit width in the X direction slightly smaller than the diameter of the conductor portion C1 of the electric wire C.

In this state, while the first holding surface 12A of the first insulator 12 is opposed to the first surface F1A of the flexible conductor F1, the first insulator 12 is moved in the −Z direction and pressed against the flexible conductor F1 and the second insulator 13.

Figure 8:
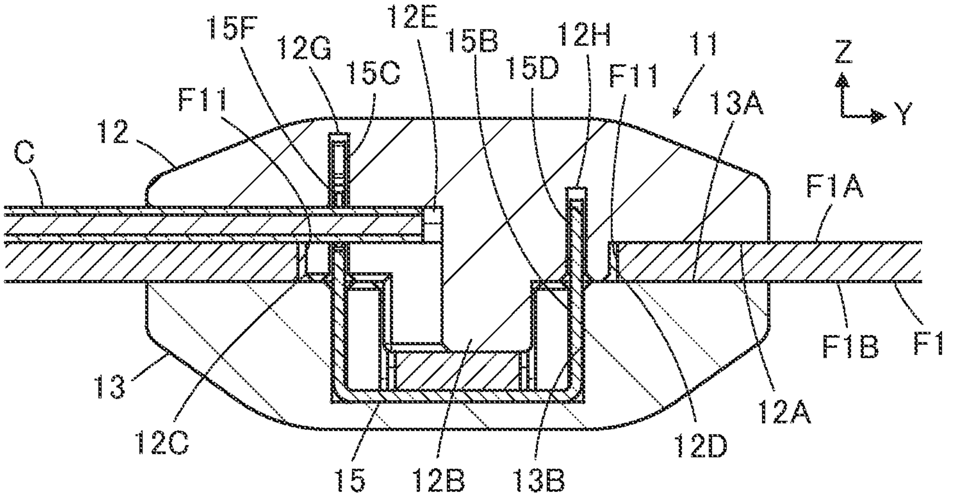
FIG. 8 is a cross-sectional side view showing the connector assembly according to Embodiment 1.

Thus, as shown in FIG. 8, the protruding portions 12C and 12D of the first insulator 12 are separately inserted into the two long holes F11 of the flexible conductor F1, and the projection 12B of the first insulator 12 is accommodated in the projection accommodating portion 15B of the contact 15 accommodated in the contact accommodating portion 13B of the second insulator 13 while pushing, in the −Z direction, a part of the flexible conductor F1 situated between the two long holes F11.

In addition, of the contact 15, a +Z directional end portion of the electric-wire connection piece 15C and the +Z directional end portion of the contact holding piece 15D which project to the +Z direction side of the flexible conductor F1 are respectively accommodated in the electric-wire-connection-piece accommodating portion 12G and the contact-holding-piece accommodating portion 12H of the first insulator 12.

Figure 9:
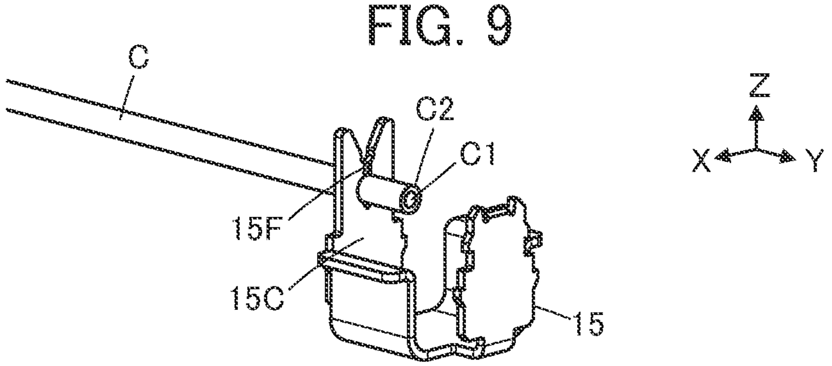
FIG. 9 is a perspective view showing an electric wire connected to the contact of the connector assembly according to Embodiment 1.

At this time, the electric wire C temporarily held in the first insulator 12 is pushed into the electric-wire contact portion 15F composed of the slit of the electric-wire connection piece 15C of the contact 15 as shown in FIG. 9, and since the electric-wire contact portion 15F has the slit width in the X direction slightly smaller than the diameter of the conductor portion C1 of the electric wire C, the insulating portion C2 covering the outer periphery of the conductor portion C1 of the electric wire C is cut and torn by an edge portion of the slit, and the electric-wire contact portion 15F makes contact with the conductor portion C1 of the electric wire C. In this manner, the conductor portion C1 of the electric wire C is electrically connected to the contact 15.

Figure 10:
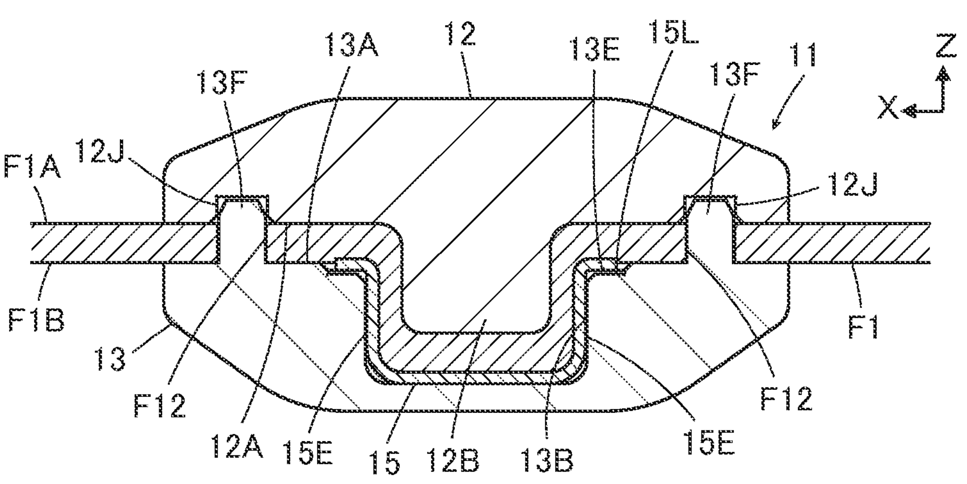
FIG. 10 is a cross-sectional front view showing the connector assembly according to Embodiment 1.

In addition, the projection 12B of the first insulator 12 is accommodated in the projection accommodating portion 15B of the contact 15 while pushing the flexible conductor F1 in the −Z direction, whereby the flexible conductor F1 is sandwiched between each of outer surfaces, separately facing in the −X direction and the +X direction, of the projection 12B and each of the pair of conductor contact pieces 15E of the contact 15 as shown in FIG. 10. In this manner, the flexible conductor F1 makes contact with the conductor contact pieces 15E of the contact 15 with predetermined contact pressure and is electrically connected to the contact 15.

Consequently, the electric wire C is electrically connected to the flexible conductor F1 via the contact 15.

Note that the +Z directional end portion of the contact holding piece 15D of the contact 15 is accommodated in the contact-holding-piece accommodating portion 12H of the first insulator 12, and the third press-fitted portions 15K of the contact holding piece 15D shown in FIG. 6 are press-fitted to an inner wall of the contact-holding-piece accommodating portion 12H, whereby the first insulator 12 is fixed to the contact 15.

In addition, as shown in FIG. 10, the two positioning pins 13F of the second insulator 13 are separately inserted into the two pin insertion holes 12J of the first insulator 12 through the two round holes F12 of the flexible conductor F1 so that the first insulator 12 and the second insulator 13 are aligned with the flexible conductor F1, and the flexible conductor F1 is held in the connector 11 by being sandwiched between the first holding surface 12A of the first insulator 12 and the second holding surface 13A of the second insulator 13.

Note that the flange 15L of the contact 15 is accommodated in the flange accommodating portion 13E of the second insulator 13.

As shown in FIG. 8, the electric-wire-end-portion accommodating portion 12E accommodating the +Y directional end portion of the electric wire C is disposed in the projection 12B, of the first insulator 12, accommodated in the projection accommodating portion 15B of the contact 15, and the electric-wire contact portion 15F of the contact 15 is connected to the electric wire C at a position where the electric-wire contact portion 15F overlaps the flexible conductor F1 in the Z direction, thereby achieving the small-sized connector 11 capable of connecting the electric wire C to the flexible conductor F1.

Embodiment 2

In Embodiment 1, the electric wire C connected to the flexible conductor F1 extends on and along the first surface F1A, facing in the +Z direction, of the flexible conductor F1, but the invention is not limited thereto.

Figure 11:
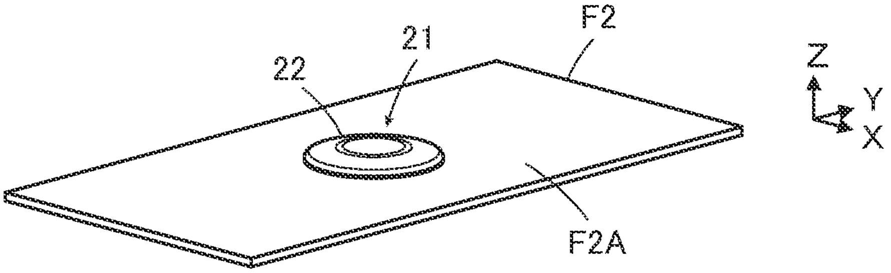
FIG. 11 is a perspective view showing a connector assembly according to Embodiment 2 when viewed from an obliquely upper position.
Figure 12:
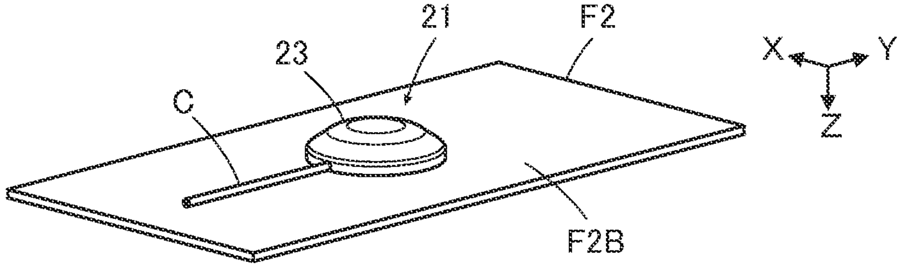
FIG. 12 is a perspective view showing the connector assembly according to Embodiment 2 when viewed from an obliquely lower position.

FIGS. 11 and 12 show a connector assembly according to Embodiment 2. This connector assembly is obtained by connecting an electric wire C to a flexible conductor F2 by means of a connector 21. The flexible conductor F2 includes a first surface F2A facing in the +Z direction and a second surface F2B facing in the −Z direction, and the electric wire C connected to the flexible conductor F2 extends on and along the second surface F2B of the flexible conductor F2.

The connector 21 includes a first insulator 22 disposed on the first surface F2A of the flexible conductor F2 and a second insulator 23 disposed on the second surface F2B of the flexible conductor F2.

Figure 13:
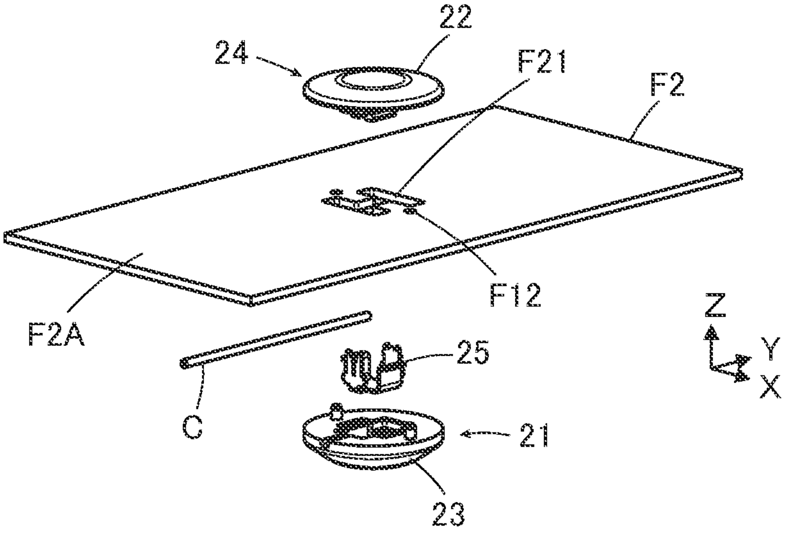
FIG. 13 is an assembly view of the connector assembly according to Embodiment 2.

FIG. 13 is an assembly view of the connector assembly according to Embodiment 2. The flexible conductor F2 has the same configuration as that of the flexible conductor F1 except that a single H-shaped hole F21 (opening portion) is formed instead of the two long holes F11 in the flexible conductor F1 used in Embodiment 1.

The first insulator 22 and the second insulator 23 of the connector 21 are attached to each other to overlap in the Z direction with the flexible conductor F2 being sandwiched therebetween, thereby forming a housing 24. The connector 21 has a contact 25 accommodated in the housing 24.

The electric wire C is the same as the electric wire C used in Embodiment 1.

Figure 14:
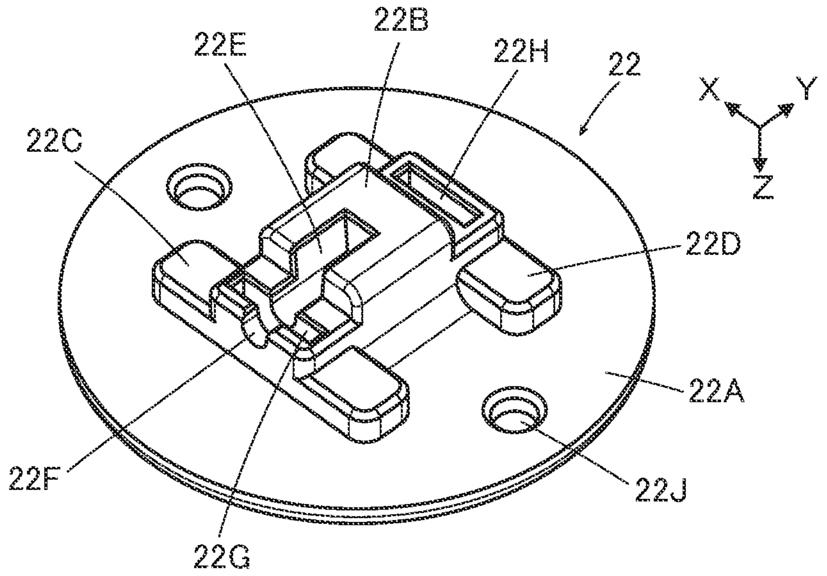
FIG. 14 is a perspective view showing a first insulator of a connector used in Embodiment 2.

As shown in FIG. 14, the first insulator 22 has substantially the same configuration as that of the first insulator 12 of the connector 11 in Embodiment 1. In other words, the first insulator 22 includes a first holding surface 22A extending in a flat shape along an XY plane, a projection 22B projecting in the −Z direction from a center portion of the first holding surface 22A, and protruding portions 22C and 22D separately formed to protrude on the first holding surface 22A at positions separately adjacent to the projection 22B on the −Y direction side and the +Y direction side thereof.

The projection 22B is provided with an electric-wire-end-portion accommodating portion 22E of groove shape opening in the −Y direction and the −Z direction, and the protruding portions 22C and 22D are respectively provided with an electric-wire-connection-piece accommodating portion 22G and a contact-holding-piece accommodating portion 22H which extend in the X direction and are recessed in the +Z direction.

Further, an electric-wire accommodating groove 22F extending in the Y direction and recessed in the +Z direction is formed to be adjacent to the electric-wire-connection-piece accommodating portion 22G on the −Y direction side and the +Y direction side thereof. The electric-wire accommodating groove 22F communicates with the electric-wire-end-portion accommodating portion 22E.

In addition, in the first holding surface 22A, two pin insertion holes 22J recessed in the +Z direction are separately formed on opposite sides across the projection 22B in the X direction so as to sandwich the projection 22B.

Figure 15:
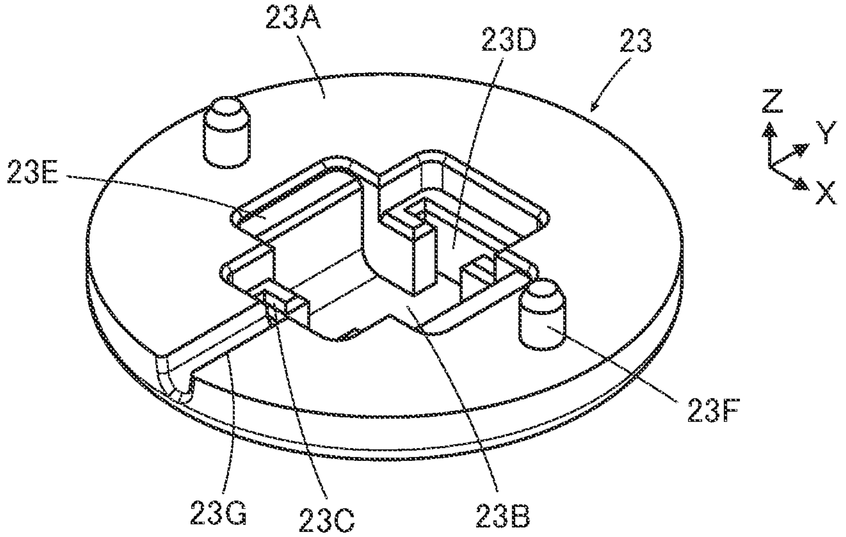
FIG. 15 is a perspective view showing a second insulator of the connector used in Embodiment 2.

As shown in FIG. 15, the second insulator 23 has substantially the same configuration as that of the second insulator 13 of the connector 11 in Embodiment 1 and includes a second holding surface 23A extending in a flat shape along an XY plane and a contact accommodating portion 23B of recess shape recessed in the −Z direction from a center portion of the second holding surface 23A. An electric-wire-connection-piece holding portion 23C and a contact-holding-piece holding portion 23D which extend in the X direction and are recessed in the −Z direction are respectively formed on the −Y direction side and the +Y direction side of the contact accommodating portion 23B. These electric-wire-connection-piece holding portion 23C and contact-holding-piece holding portion 23D communicate with the contact accommodating portion 23B.

In addition, flange accommodating portions 23E each having a step shape recessed in the −Z direction and communicating with the contact accommodating portion 23B are separately formed at parts of the second holding surface 23A separately situated on a −X directional end portion and a +X directional end portion of the contact accommodating portion 23B.

Further, on the second holding surface 23A, two positioning pins 23F projecting in the +Z direction are separately formed on opposite sides across the contact accommodating portion 23B in the X direction so as to sandwich the contact accommodating portion 23B.

An electric-wire accommodating groove 23G extending in the Y direction and recessed in the −Z direction is formed at a part of the second holding surface 23A situated on the −Y direction side of the contact accommodating portion 23B and communicates with the contact accommodating portion 23B.

In other words, in Embodiment 2, the electric-wire accommodating groove 23G for accommodating the electric wire C extending on and along the second surface F2B of the flexible conductor F2 shown in FIG. 12 is formed in the second holding surface 23A of the second insulator 23.

Figure 16:
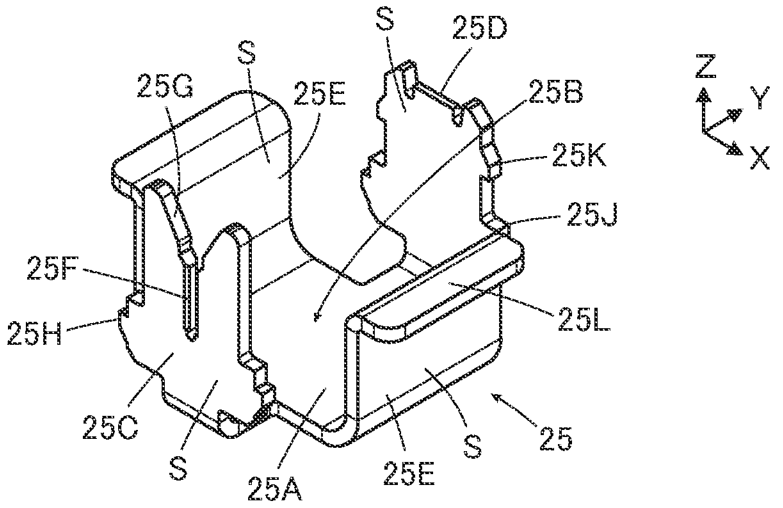
FIG. 16 is a perspective view showing a contact of the connector used in Embodiment 2.

As shown in FIG. 16, the contact 25 has substantially the same configuration as that of the contact 15 of the connector 11 in Embodiment 1. The contact 25 includes a bottom plate portion 25A of rectangular shape, four side wall portions S extending in the +Z direction separately from four edge portions of the bottom plate portion 25A and separated from one another, and a projection accommodating portion 25B formed by being surrounded by the bottom plate portion 25A and the four side wall portions S.

Of the four side wall portions S, two side wall portions S facing each other in the Y direction and constituting a first side wall pair are separately formed from an electric-wire connection piece 25C and a contact holding piece 25D, while two side wall portions S facing each other in the X direction and constituting a second side wall pair are each formed from a conductor contact piece 25E.

An electric-wire contact portion 25F composed of a slit extending in the Z direction is formed at a tip in the +Z direction of the electric-wire connection piece 25C, and an opening end portion 25G having a taper shape opening in the +Z direction is formed at a +Z directional end portion of the slit.

First press-fitted portions 25H projecting in the X direction are separately formed at opposite edge portions in the X direction of a part of the electric-wire connection piece 25C situated on the −Z direction side of the electric-wire contact portion 25F.

Second press-fitted portions 25J projecting in the X direction are separately formed at opposite edge portions in the X direction of a middle part in the Z direction of the contact holding piece 25D, and third press-fitted portions 25K projecting in the X direction are separately formed at opposite edge portions in the X direction of a part of the contact holding piece 25D near a +Z directional end portion of the contact holding piece 25D.

A flange 25L extending out of the projection accommodating portion 25B and along an XY plane is formed at a +Z directional end portion of the conductor contact piece 25E.

Figure 17:
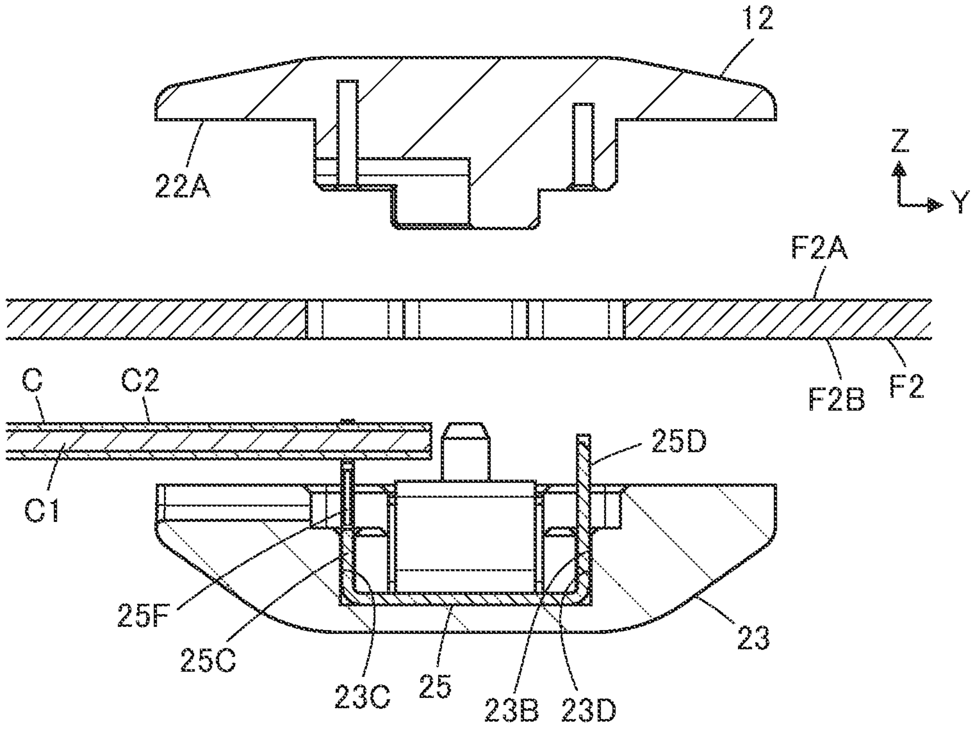
FIG. 17 is a cross-sectional side view of the connector assembly according to Embodiment 2 in the process of assembling.

Here, the method of assembling the connector assembly according to Embodiment 2 is described. First, as shown in FIG. 17, the contact 25 is accommodated in the contact accommodating portion 23B of the second insulator 23, and a part of the electric wire C near a +Y directional end portion of the electric wire C is disposed on the electric-wire connection piece 25C of the contact 25.

At this time, the electric-wire connection piece 25C and the contact holding piece 25D of the contact 25 are respectively pushed into the electric-wire-connection-piece holding portion 23C and the contact-holding-piece holding portion 23D of the second insulator 23, and the first press-fitted portions 25H of the electric-wire connection piece 25C and the second press-fitted portions 25J of the contact holding piece 25D shown in FIG. 16 are respectively press-fitted to an inner wall of the electric-wire-connection-piece holding portion 23C and an inner wall of the contact-holding-piece holding portion 23D, whereby the contact 25 is fixed to the contact accommodating portion 23B of the second insulator 23.

Figure 18:
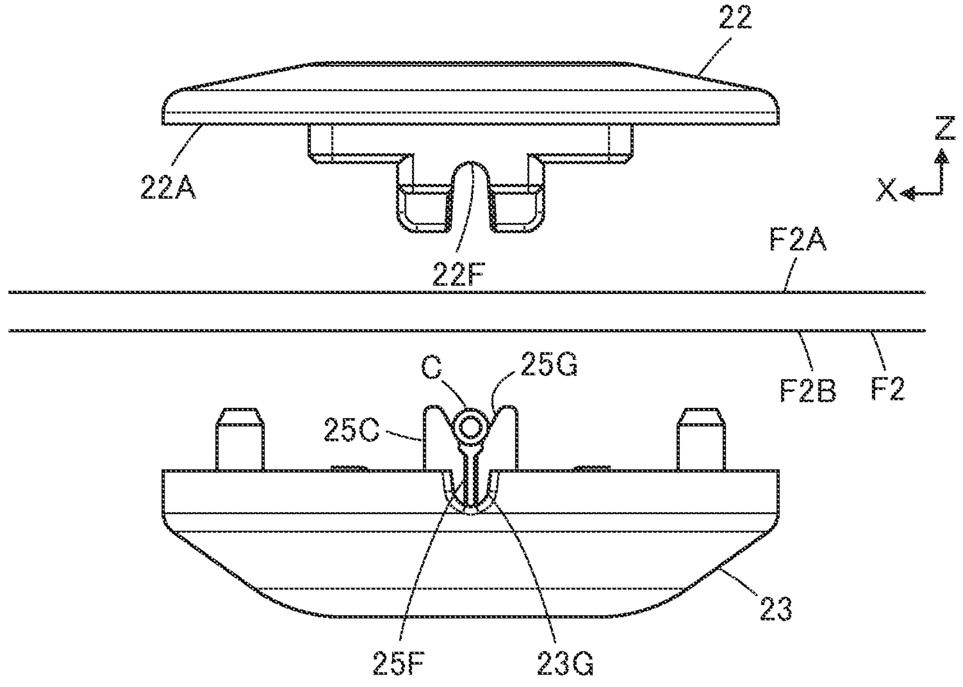
FIG. 18 is a front view of the connector assembly according to Embodiment 2 in the process of assembling.

In addition, as shown in FIG. 18, the electric wire C is disposed on the opening end portion 25G having a taper shape without being inserted in the electric-wire contact portion 25F composed of the slit of the electric-wire connection piece 25C of the contact 25.

In this state, while the flexible conductor F2 is sandwiched between the first insulator 22 and the second insulator 23 and the first holding surface 22A of the first insulator 22 is opposed to the first surface F2A of the flexible conductor F2, the first insulator 22 is moved in the −Z direction and, together with the flexible conductor F2, pressed against the second insulator 23.

Figure 19:
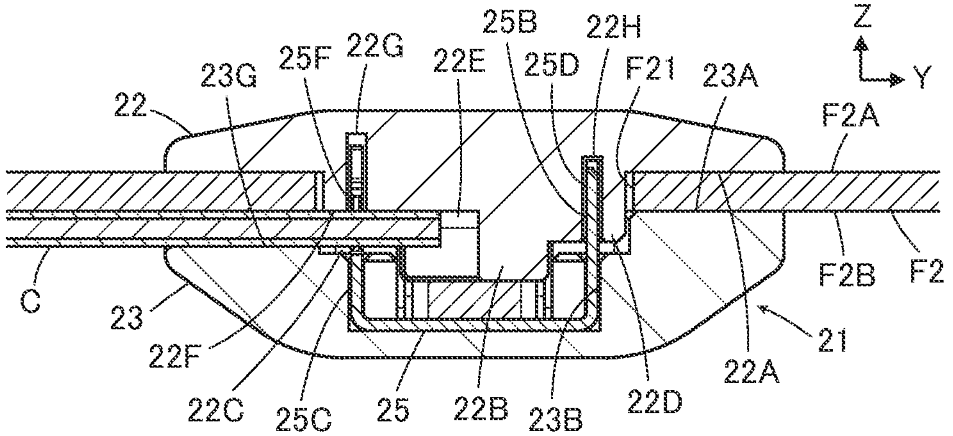
FIG. 19 is a cross-sectional side view showing the connector assembly according to Embodiment 2.

Thus, as shown in FIG. 19, the protruding portions 22C and 22D of the first insulator 22 are inserted into the H-shaped hole F21 of the flexible conductor F2, and the projection 22B of the first insulator 22 is accommodated in the projection accommodating portion 25B of the contact 25 accommodated in the contact accommodating portion 23B of the second insulator 23 while pushing, in the −Z direction, a part of the flexible conductor F2 adjacent to the hole F21.

In addition, of the contact 25, a +Z directional end portion of the electric-wire connection piece 25C and the +Z directional end portion of the contact holding piece 25D which project to the +Z direction side of the flexible conductor F2 are respectively accommodated in the electric-wire-connection-piece accommodating portion 22G and the contact-holding-piece accommodating portion 22H of the first insulator 22.

At this time, the electric wire C disposed on the opening end portion 25G of the electric-wire connection piece 25C of the contact 25 is pushed into the electric-wire contact portion 25F composed of the slit of the electric-wire connection piece 25C by the electric-wire accommodating groove 25F of the first insulator 22 and is electrically connected to the contact 25.

Figure 20:
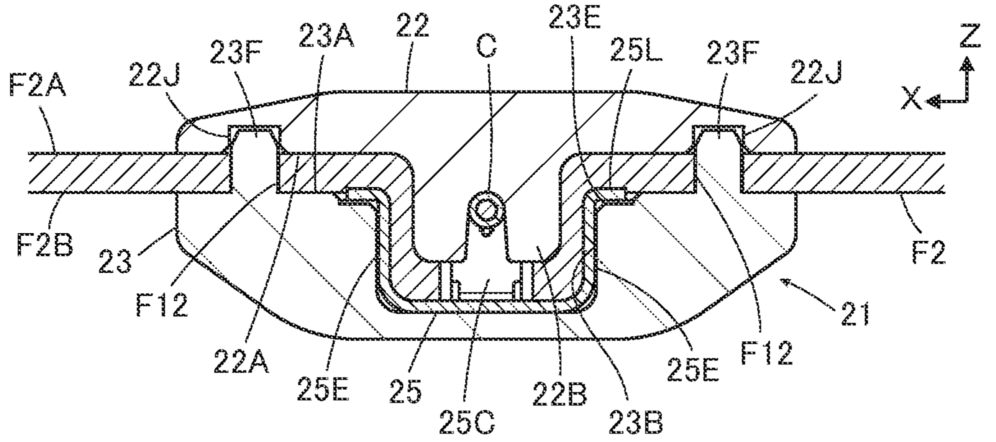
FIG. 20 is a cross-sectional front view showing the connector assembly according to Embodiment 2.

In addition, the projection 22B of the first insulator 22 is accommodated in the projection accommodating portion 25B of the contact 25 while pushing the flexible conductor F2 in the −Z direction, whereby the flexible conductor F2 is sandwiched between each of outer surfaces, separately facing in the −X direction and the +X direction, of the projection 22B and each of the pair of conductor contact pieces 25E of the contact 25 as shown in FIG. 20. In this manner, the flexible conductor F2 makes contact with the conductor contact pieces 25E of the contact 25 with predetermined contact pressure and is electrically connected to the contact 25.

Consequently, the electric wire C extending on and along the second surface F2B of the flexible conductor F2 is electrically connected to the flexible conductor F2 via the contact 25.

Note that the +Z directional end portion of the contact holding piece 25D of the contact 25 is accommodated in the contact-holding-piece accommodating portion 22H of the first insulator 22, and the third press-fitted portions 25K of the contact holding piece 25D shown in FIG. 16 are press-fitted to an inner wall of the contact-holding-piece accommodating portion 22H, whereby the first insulator 22 is fixed to the contact 25.

In addition, as shown in FIG. 20, the two positioning pins 23F of the second insulator 23 are separately inserted into the two pin insertion holes 22J of the first insulator 22 through the two round holes F12 of the flexible conductor F2 so that the first insulator 22 and the second insulator 23 are aligned with the flexible conductor F2, and the flexible conductor F2 is held in the connector 21 by being sandwiched between the first holding surface 22A of the first insulator 22 and the second holding surface 23A of the second insulator 23.

Note that the flanges 25L of the contact 25 are separately accommodated in the flange accommodating portions 23E of the second insulator 23.

With this configuration, the electric wire C can be connected to the flexible conductor F2 by the small-sized connector 21 even when the electric wire C extends on and along the second surface F2B of the flexible conductor F2.

Embodiment 3

While the flexible conductor F1 used in Embodiment 1 includes the two long holes F11 and the two round holes F12 in a region to be sandwiched between the first insulator 12 and the second insulator 13, and the flexible conductor F2 used in Embodiment 2 includes the single H-shaped hole F21 and the two round holes F12 in a region to be sandwiched between the first insulator 22 and the second insulator 23, a connector assembly can be configured even when the flexible conductor does not include these holes.

Figure 21:
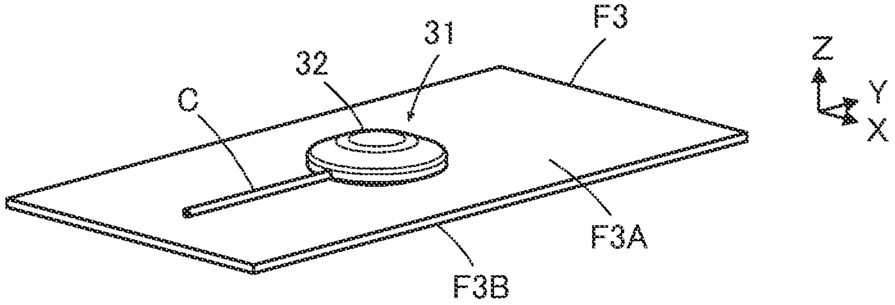
FIG. 21 is a perspective view showing a connector assembly according to Embodiment 3 when viewed from an obliquely upper position.

FIG. 21 shows a connector assembly according to Embodiment 3. This connector assembly is obtained by connecting an electric wire C to a flexible conductor F3 by means of a connector 31. The flexible conductor F3 includes a first surface F3A facing in the +Z direction and a second surface F3B facing in the −Z direction, and the electric wire C connected to the flexible conductor F3 extends on and along the first surface F3A of the flexible conductor F3.

Figure 22:
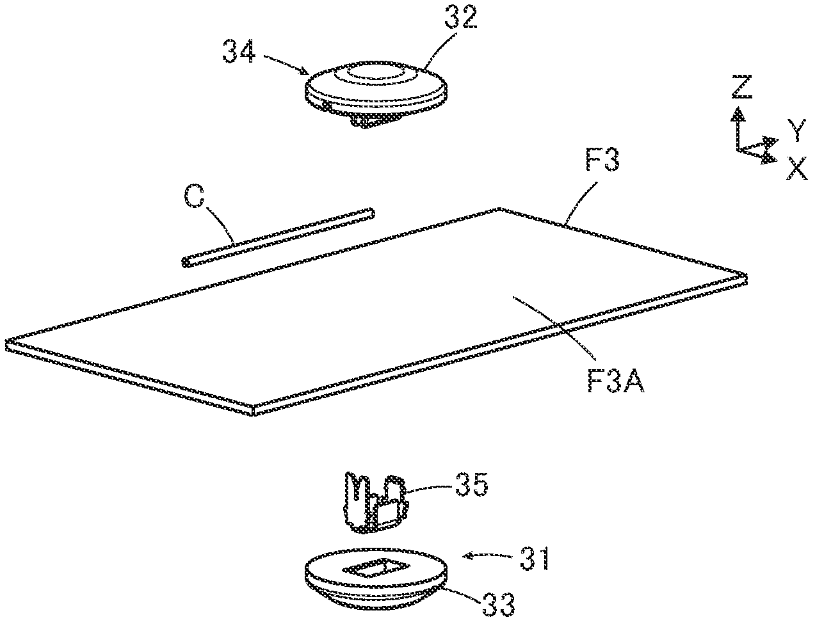
FIG. 22 is an assembly view of the connector assembly according to Embodiment 3.

FIG. 22 is an assembly view of the connector assembly according to Embodiment 3. The flexible conductor F3 is configured such that the two long holes F11 and the two round holes F12 in the flexible conductor F1 used in Embodiment 1 are omitted and does not include any opening portion such as a through-hole penetrating between the first surface F3A and the second surface F3B.

The connector 31 includes a first insulator 32 disposed on the first surface F3A of the flexible conductor F3 and a second insulator 33 disposed on the second surface F3B of the flexible conductor F3. The first insulator 32 and the second insulator 33 are attached to each other to overlap in the Z direction with the flexible conductor F3 being sandwiched therebetween, thereby forming a housing 34. Further, the connector 31 includes a contact 35 accommodated in the housing 34.

The electric wire C is the same as the electric wires C used in Embodiments 1 and 2.

Figure 23:
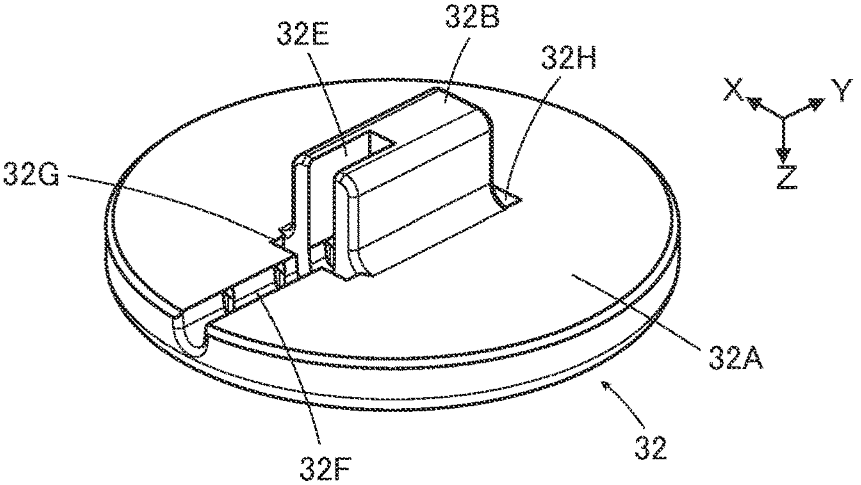
FIG. 23 is a perspective view showing a first insulator of a connector used in Embodiment 3.

As shown in FIG. 23, the first insulator 32 is made of an insulating material such as an insulating resin and includes a first holding surface 32A extending in a flat shape along an XY plane and a projection 32B of quadrangular prism shape projecting in the −Z direction from a center portion of the first holding surface 32A.

The projection 32B is provided with an electric-wire-end-portion accommodating portion 32E opening in the −Y direction and the −Z direction, and an electric-wire accommodating groove 32F extending in the Y direction and recessed in the +Z direction is formed at a part of the first holding surface 32A situated on the −Y direction side of the projection 32B and communicates with the electric-wire-end-portion accommodating portion 32E.

In addition, in the first holding surface 32A, an electric-wire-connection-piece accommodating portion 32G and a contact-holding-piece accommodating portion 32H which extend in the X direction and are recessed in the +Z direction are separately formed at positions adjacent to the projection 32B on the −Y direction side and the +Y direction side thereof.

Figure 24:
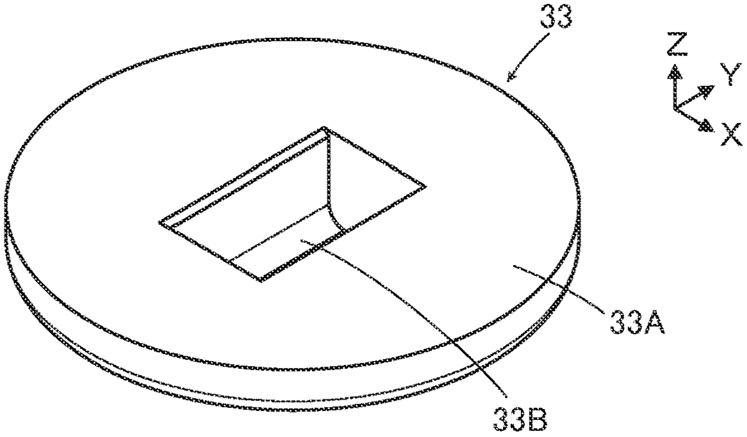
FIG. 24 is a perspective view showing a second insulator of the connector used in Embodiment 3.

As shown in FIG. 24, the second insulator 33 is made of an insulating material such as an insulating resin and includes a second holding surface 33A extending in a flat shape along an XY plane and a contact accommodating portion 33B recessed in the −Z direction from a center portion of the second holding surface 33A.

Figure 25:
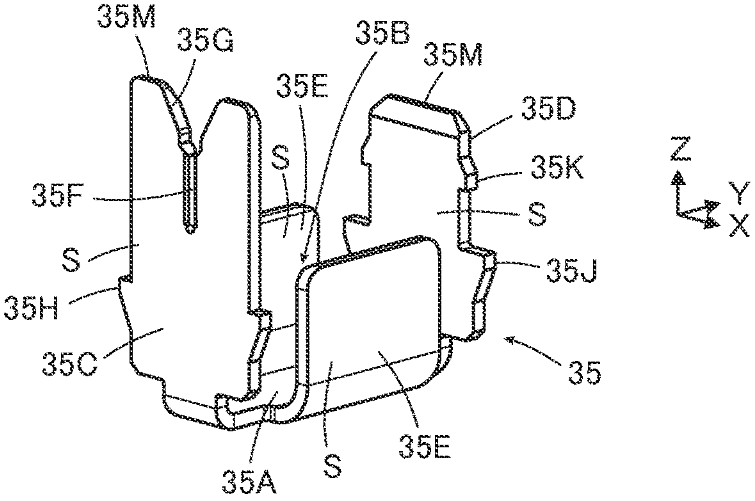
FIG. 25 is a perspective view showing a contact of the connector used in Embodiment 3.

As shown in FIG. 25, as with the contact 15 of the connector 11 in Embodiment 1, the contact 35 includes a bottom plate portion 35A of rectangular shape, four side wall portions S extending in the +Z direction separately from four edge portions of the bottom plate portion 35A and separated from one another, and a projection accommodating portion 35B formed by being surrounded by the bottom plate portion 35A and the four side wall portions S.

Of the four side wall portions S, two side wall portions S facing each other in the Y direction and constituting a first side wall pair are separately formed from an electric-wire connection piece 35C and a contact holding piece 35D, and two side wall portions S facing each other in the X direction and constituting a second side wall pair are both formed from a conductor contact piece 35E. The conductor contact piece 35E has a Z direction height corresponding to a Z direction depth of the contact accommodating portion 33B of the second insulator 33, and the electric-wire connection piece 35C and the contact holding piece 35D extend longer than the conductor contact piece 35E in the +Z direction.

An electric-wire contact portion 35F composed of a slit extending in the Z direction is formed at a tip in the +Z direction of the electric-wire connection piece 35C, and an opening end portion 35G having a taper shape opening in the +Z direction is formed at a +Z directional end portion of the slit.

First press-fitted portions 35H projecting in the X direction are separately formed at opposite edge portions in the X direction of a part of the electric-wire connection piece 35C situated on the −Z direction side of the electric-wire contact portion 35F.

Second press-fitted portions 35J projecting in the X direction are separately formed at opposite edge portions in the X direction of a middle part in the Z direction of the contact holding piece 35D, and third press-fitted portions 35K projecting in the X direction are separately formed at opposite edge portions in the X direction of a part of the contact holding piece 35D near a +Z directional end portion of the contact holding piece 35D.

In addition, at a +Z directional end portion of the electric-wire connection piece 35C, blade portions 35M sharply pointed in the +Z direction are separately formed on opposite sides across the opening end portion 35G in the X direction so as to sandwich the opening end portion 35G.

Similarly, a blade portion 35M sharply pointed in the +Z direction is also formed at the +Z directional end portion of the contact holding piece 35D.

These blade portions 35M are provided to tear the flexible conductor F3.

Figure 26:
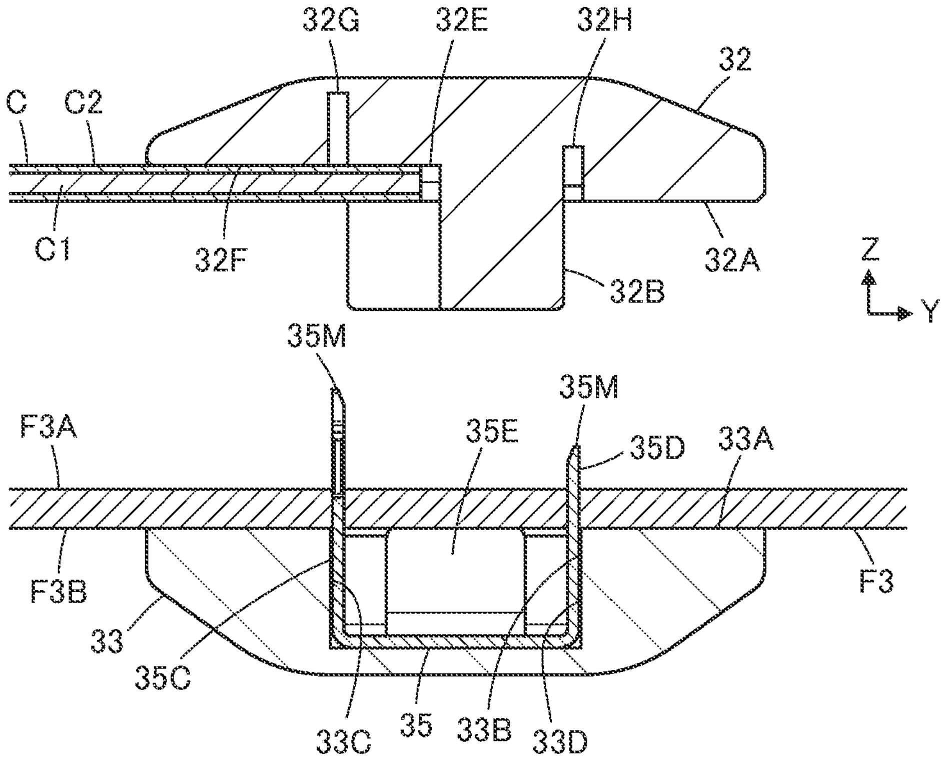
FIG. 26 is a cross-sectional side view of the connector assembly according to Embodiment 3 in the process of assembling.

Here, the method of assembling the connector assembly according to Embodiment 3 is described. First, as shown in FIG. 26, the contact 35 is accommodated in the contact accommodating portion 33B of the second insulator 33.

At this time, the electric-wire connection piece 35C and the contact holding piece 35D of the contact 35 are respectively pushed into an electric-wire-connection-piece holding portion 33C and a contact-holding-piece holding portion 33D of the second insulator 33, and the first press-fitted portions 35H of the electric-wire connection piece 35C and the second press-fitted portions 35J of the contact holding piece 35D shown in FIG. 25 are respectively press-fitted to an inner wall of the electric-wire-connection-piece holding portion 33C and an inner wall of the contact-holding-piece holding portion 33D, whereby the contact 35 is fixed to the contact accommodating portion 33B of the second insulator 33.

While the conductor contact piece 35E of the contact 35 has the Z direction height corresponding to the Z direction depth of the contact accommodating portion 33B of the second insulator 33, since the electric-wire connection piece 35C and the contact holding piece 35D extend longer than the conductor contact piece 35E in the +Z direction, the electric-wire connection piece 35C and the contact holding piece 35D project in the +Z direction from the second holding surface 33A of the second insulator 33.

When the second insulator 33 is relatively moved from the −Z direction with respect to the second surface F3B of the flexible conductor F3, the electric-wire connection piece 35C and the contact holding piece 35D which project in the +Z direction from the second holding surface 33A of the second insulator 33 makes contact with the second surface F3B of the flexible conductor F3, and further, when the second insulator 33 is pressed against the flexible conductor F3, the flexible conductor F3 is torn by the blade portions 35M formed at the +Z directional end portion of the electric-wire connection piece 35C and the +Z directional end portion of the contact holding piece 35D.

Figure 27:
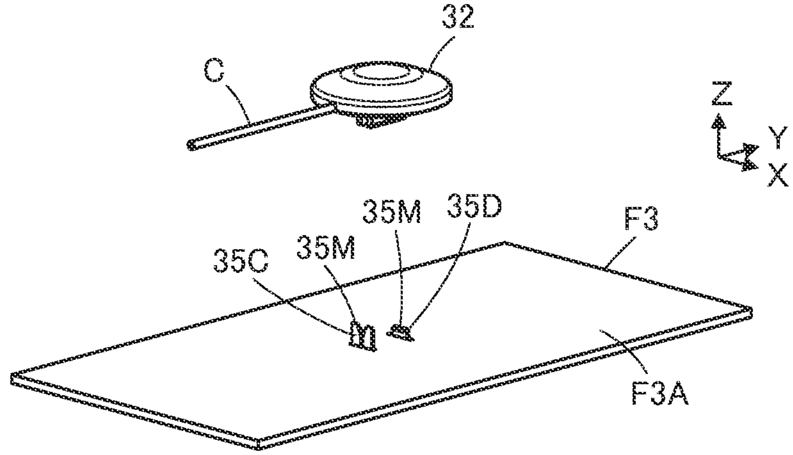
FIG. 27 is a perspective view of the connector assembly according to Embodiment 3 in the process of assembling.

Thus, the flexible conductor F3 is disposed on the second holding surface 33A of the second insulator 33, and as shown in FIG. 27, the +Z directional end portion of the electric-wire connection piece 35C and the +Z directional end portion of the contact holding piece 35D project in the +Z direction from the flexible conductor F3 separately through the parts where the flexible conductor F3 is torn.

In addition, a +Y directional end portion of the electric wire C is pushed into the electric-wire-end-portion accommodating portion 32E of the first insulator 32, and a part of the electric wire C continuing to the +Y directional end portion is pushed into the electric-wire accommodating groove 32F, whereby the electric wire C is temporarily held in the first insulator 32.

In this state, while the first holding surface 32A of the first insulator 32 is opposed to the first surface F3A of the flexible conductor F3, the first insulator 32 is moved in the −Z direction and pressed against the second insulator 33 on which the flexible conductor F3 is disposed.

Figure 28:
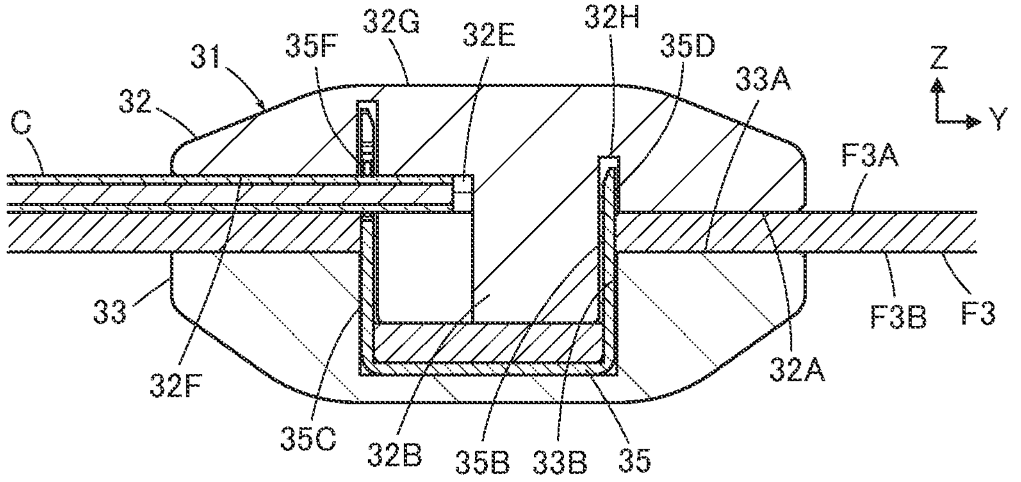
FIG. 28 is a cross-sectional side view showing the connector assembly according to Embodiment 3.

Thus, as shown in FIG. 28, the projection 32B of the first insulator 32 is accommodated in the projection accommodating portion 35B of the contact 35 accommodated in the contact accommodating portion 33B of the second insulator 33 while pushing, in the −Z direction, a part of the flexible conductor F3 situated between the part torn by the blade portions 35M of the electric-wire connection piece 35C of the contact 35 and the part torn by the blade portion 35M of the contact holding piece 35D.

Of the contact 35, the +Z directional end portion of the electric-wire connection piece 35C and the +Z directional end portion of the contact holding piece 35D which project to the +Z direction side of the flexible conductor F3 are respectively accommodated in the electric-wire-connection-piece accommodating portion 32G and the contact-holding-piece accommodating portion 32H of the first insulator 32.

At this time, the electric wire C temporarily held in the first insulator 32 is pushed into the electric-wire contact portion 35F composed of the slit of the electric-wire connection piece 35C of the contact 35 and is electrically connected to the contact 35.

Figure 29:
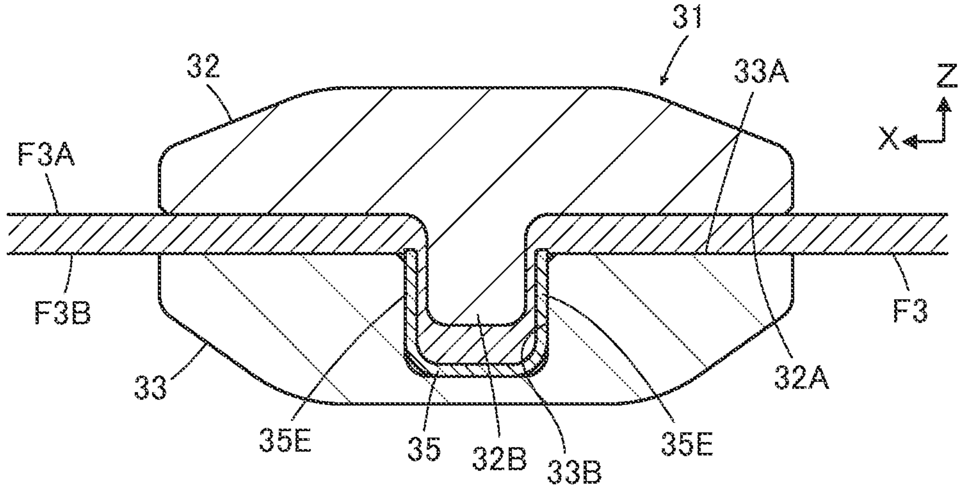
FIG. 29 is a cross-sectional front view showing the connector assembly according to Embodiment 3.

In addition, the projection 32B of the first insulator 32 is accommodated in the projection accommodating portion 35B of the contact 35 while pushing the flexible conductor F3 in the −Z direction, whereby the flexible conductor F3 is sandwiched between each of outer surfaces, separately facing in the −X direction and the +X direction, of the projection 32B and each of the pair of conductor contact pieces 35E of the contact 35 as shown in FIG. 29. In this manner, the flexible conductor F3 makes contact with the conductor contact pieces 35E of the contact 35 with predetermined contact pressure and is electrically connected to the contact 35.

Consequently, the electric wire C is electrically connected to the flexible conductor F3 via the contact 35.

Note that the +Z directional end portion of the contact holding piece 35D of the contact 35 is accommodated in the contact-holding-piece accommodating portion 32H of the first insulator 32, and the third press-fitted portions 35K of the contact holding piece 35D shown in FIG. 25 are press-fitted to an inner wall of the contact-holding-piece accommodating portion 32H, whereby the first insulator 32 is fixed to the contact 35.

With this configuration, the electric wire C can be connected to the flexible conductor F3 by means of the small-sized connector 31 even when the flexible conductor F3 does not include any opening portion such as a through-hole.

Embodiment 4

In the contacts 15, 25, 35 used in Embodiments 1 to 3, of the four side wall portions S, the two side wall portions S facing each other in the Y direction are separately formed from the electric-wire connection piece 15C, 25C, 35C and the contact holding piece 15D, 25D, 35D, while the two side wall portions S facing each other in the X direction are each formed from the conductor contact piece 15E, 25E, 35E, but the invention is not limited thereto.

Figure 30:
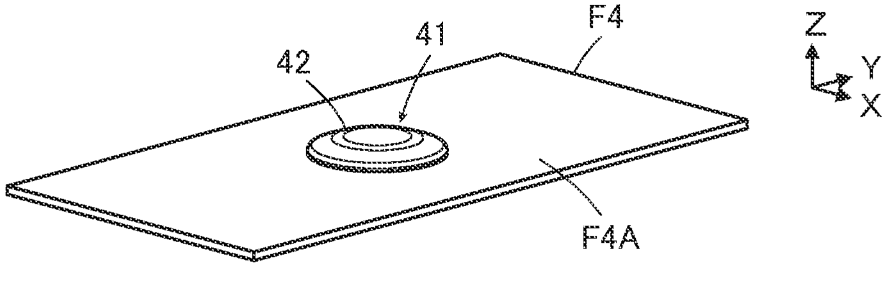
FIG. 30 is a perspective view showing a connector assembly according to Embodiment 4 when viewed from an obliquely upper position.
Figure 31:
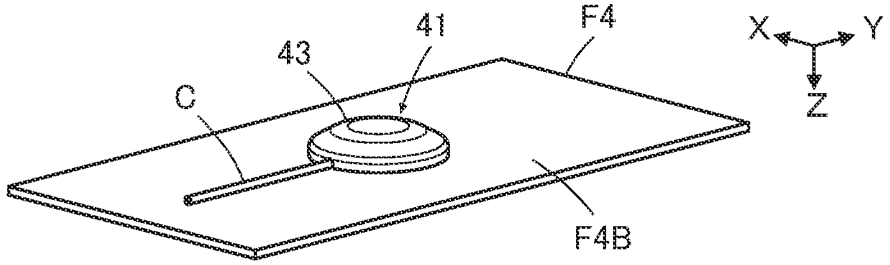
FIG. 31 is a perspective view showing the connector assembly according to Embodiment 4 when viewed from an obliquely lower position.

FIGS. 30 and 31 show a connector assembly according to Embodiment 4. This connector assembly is obtained by connecting an electric wire C to a flexible conductor F4 by means of a connector 41. The flexible conductor F4 includes a first surface F4A facing in the +Z direction and a second surface F4B facing in the −Z direction, and the electric wire C connected to the flexible conductor F4 extends on and along the second surface F4B of the flexible conductor F4.

The connector 41 includes a first insulator 42 disposed on the first surface F4A of the flexible conductor F4 and a second insulator 43 disposed on the second surface F4B of the flexible conductor F4.

Figure 32:
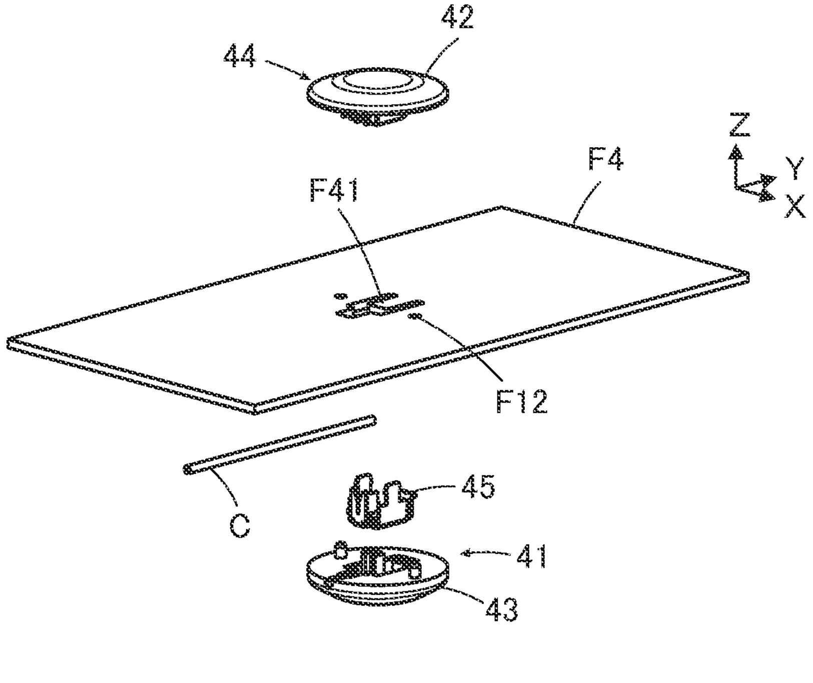
FIG. 32 is an assembly view of the connector assembly according to Embodiment 4.

FIG. 32 is an assembly view of the connector assembly according to Embodiment 4. The flexible conductor F4 has the same configuration as that of the flexible conductor F1 except that a single substantially U-shaped hole F41 (opening portion) is formed instead of the two long holes F11 in the flexible conductor F1 used in Embodiment 1.

The first insulator 42 and the second insulator 43 of the connector 41 are attached to each other to overlap in the Z direction with the flexible conductor F4 being sandwiched therebetween, thereby forming a housing 44. The connector 41 has a contact 45 accommodated in the housing 44.

The electric wire C is the same as the electric wires C used in Embodiments 1 to 3.

Figure 33:
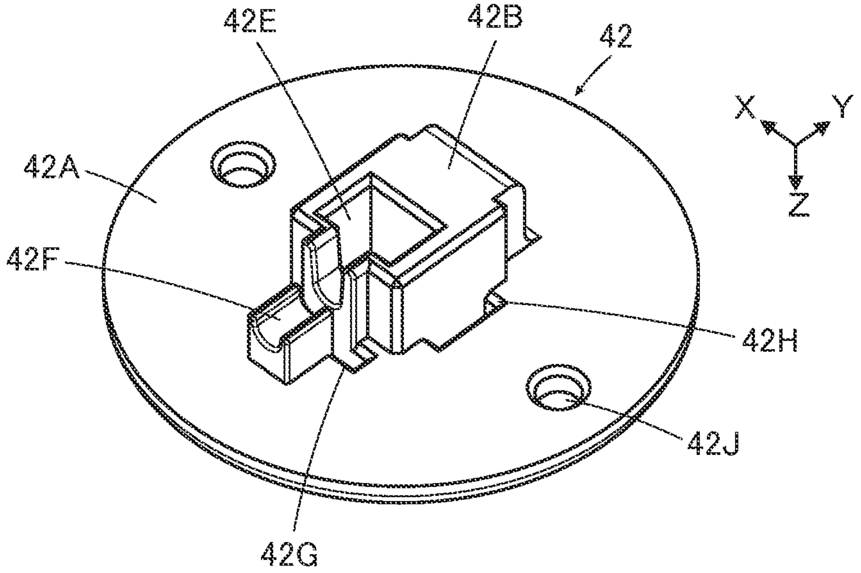
FIG. 33 is a perspective view showing a first insulator of a connector used in Embodiment 4.

As shown in FIG. 33, the first insulator 42 is made of an insulating material such as an insulating resin and includes a first holding surface 42A extending in a flat shape along an XY plane and a projection 42B of substantially quadrangular prism shape projecting in the −Z direction from a center portion of the first holding surface 42A.

The projection 42B is provided with an electric-wire-end-portion accommodating portion 42E opening in the −Y direction and the −Z direction.

In addition, in the first holding surface 42A, an electric-wire-connection-piece accommodating portion 42G extending in the X direction and recessed in the +Z direction is formed at a position adjacent to the projection 42B on the −Y direction side thereof, and contact-holding-piece accommodating portions 42H extending in the Y direction and recessed in the +Z direction are separately formed at positions separately adjacent to the projection 42B on the −X direction side and the +X direction side thereof.

Further, an electric-wire accommodating groove 42F extending in the Y direction and recessed in the +Z direction is formed to be adjacent to the electric-wire-connection-piece accommodating portion 42G on the −Y direction side and the +Y direction side thereof. The electric-wire accommodating groove 42F communicates with the electric-wire-end-portion accommodating portion 42E.

In addition, in the first holding surface 42A, two pin insertion holes 42J recessed in the +Z direction are separately formed on opposite sides across the projection 42B in the X direction so as to sandwich the projection 42B.

Figure 34:
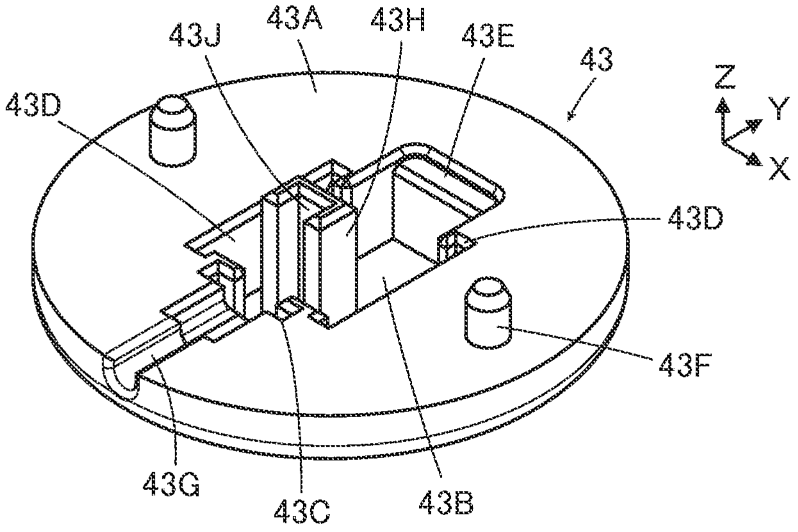
FIG. 34 is a perspective view showing a second insulator of the connector used in Embodiment 4.

As shown in FIG. 34, the second insulator 43 is made of an insulating material such as an insulating resin and includes a second holding surface 43A extending in a flat shape along an XY plane and a contact accommodating portion 43B recessed in the −Z direction from a center portion of the second holding surface 43A. An electric-wire-connection-piece holding portion 43C extending in the X direction and recessed in the −Z direction is formed on the −Y direction side of the contact accommodating portion 43B, and contact-holding-piece holding portions 43D extending in the Y direction and recessed in the −Z direction are separately formed on the −X direction side and the +X direction side of the contact accommodating portion 43B. These electric-wire-connection-piece holding portion 43C and contact-holding-piece holding portions 43D communicate with the contact accommodating portion 43B.

In addition, a columnar portion 43H extending in the Z direction is formed in the contact accommodating portion 43B. The columnar portion 43H extends in the +Z direction from the bottom of the contact accommodating portion 43B and project in the +Z direction from the second holding surface 43A while a gap is provided between the columnar portion 43H and an inner wall portion of the contact accommodating portion 43B. The columnar portion 43H is provided with an electric-wire-end-portion guide groove 43J extending in the Z direction and opening in the −Y direction over the entire length of the columnar portion 43H.

In addition, a flange accommodating portion 43E having a step shape recessed in the −Z direction and communicating with the contact accommodating portion 43B is formed at a part of the second holding surface 43A situated on a +Y directional end portion of the contact accommodating portion 43B.

Further, on the second holding surface 43A, two positioning pins 43F projecting in the +Z direction are separately formed on opposite sides across the contact accommodating portion 43B in the X direction so as to sandwich the contact accommodating portion 43B.

An electric-wire accommodating groove 43G extending in the Y direction and recessed in the −Z direction is formed at a part of the second holding surface 43A situated on the −Y direction side of the contact accommodating portion 43B and communicates with the contact accommodating portion 43B.

Figure 35:
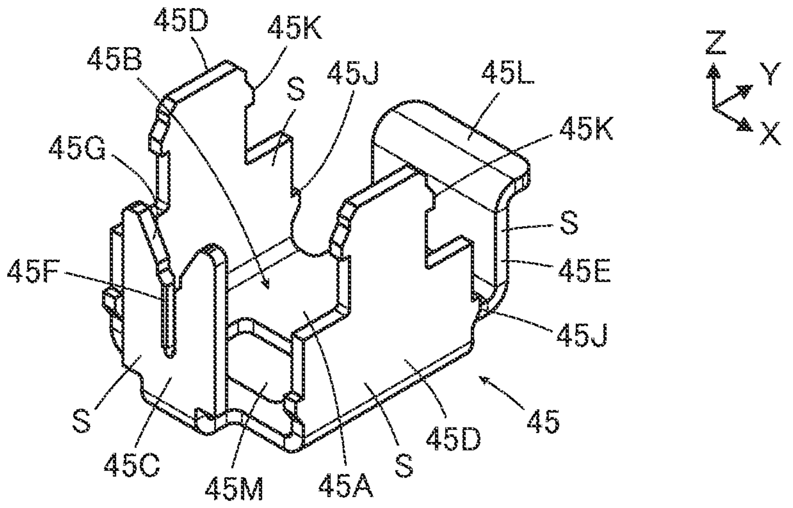
FIG. 35 is a perspective view showing a contact of the connector used in Embodiment 4.

As shown in FIG. 35, the contact 45 includes a bottom plate portion 45A of rectangular shape, four side wall portions S extending in the +Z direction separately from four edge portions of the bottom plate portion 45A and separated from one another, and a projection accommodating portion 45B formed by being surrounded by the bottom plate portion 45A and the four side wall portions S.

Of the four side wall portions S, two side wall portions S facing each other in the Y direction and constituting a first side wall pair are separately formed from an electric-wire connection piece 45C and a conductor contact piece 45E, and two side wall portions S facing each other in the X direction and constituting a second side wall pair are each formed from a contact holding piece 45D.

An electric-wire contact portion 45F composed of a slit extending in the Z direction is formed at a tip in the +Z direction of the electric-wire connection piece 45C, and an opening end portion 45G having a taper shape opening in the +Z direction is formed at a +Z directional end portion of the slit.

Second press-fitted portions 45J projecting in the Y direction are separately formed at opposite edge portions in the Y direction of a part of the contact holding piece 45D situated near a −Z directional end portion of the contact holding piece 450, and third press-fitted portions 45K projecting in the Y direction are separately formed at opposite edge portions in the Y direction of a part of the contact holding piece 45D situated near a +Z directional end portion of the contact holding piece 45D.

A flange 45L extending out of the projection accommodating portion 45B and along an XY plane is formed at a +Z directional end portion of the conductor contact piece 45E.

In addition, a through-hole 45M of rectangular shape is formed in the bottom plate portion 45A. The through-hole 45M is provided to allow, when the connector assembly is assembled, the columnar portion 43H of the second insulator 43 to pass therethrough.

Figure 36:
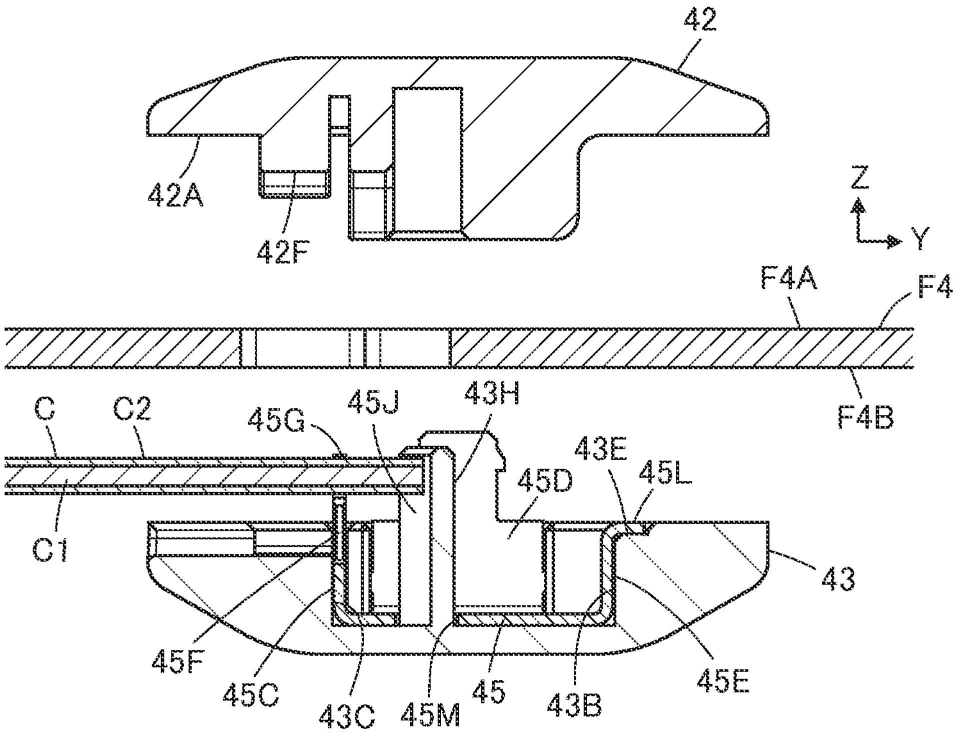
FIG. 36 is a cross-sectional side view of the connector assembly according to Embodiment 4 in the process of assembling.
Figure 37:
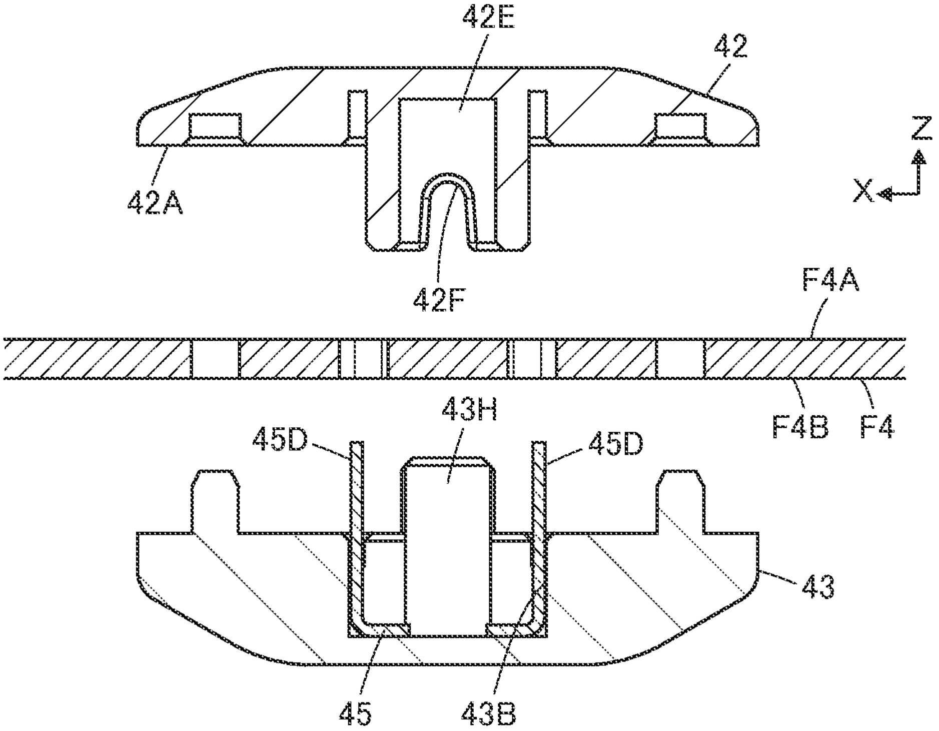
FIG. 37 is a cross-sectional front view of the connector assembly according to Embodiment 4 in the process of assembling.

Here, the method of assembling the connector assembly according to Embodiment 4 is described. First, as shown in FIGS. 36 and 37, the contact 45 is accommodated in the contact accommodating portion 43B of the second insulator 43. At this time, the columnar portion 43H of the second insulator 43 is passed through the through-hole 45M formed in the bottom plate portion 45A of the contact 45, and the flange 45L formed at the +Z directional end portion of the conductor contact piece 45E of the contact 45 is accommodated in the flange accommodating portion 43E of the second insulator 43.

In addition, the pair of contact holding pieces 45D of the contact 45 are pushed into the contact accommodating portion 43B of the second insulator 43, and the second press-fitted portions 45J of each of the contact holding pieces 45D shown in FIG. 35 are press-fitted to an inner wall of the contact accommodating portion 43B, whereby the contact 45 is fixed to the contact accommodating portion 43B of the second insulator 43.

Further, a part of the electric wire C near the +Y directional end portion of the electric wire C is disposed on the electric-wire connection piece 45C of the contact 45. The electric wire C is disposed on the opening end portion 45G having a taper shape without being inserted into the electric-wire contact portion 45F composed of the slit of the electric-wire connection piece 45C of the contact 45, and the Y directional end portion of the electric wire C is inserted from the −Y direction into the electric-wire-end-portion guide groove 43J of the columnar portion 43H of the second insulator 43.

In this state, while the flexible conductor F4 is sandwiched between the first insulator 42 and the second insulator 43, and the first holding surface 42A of the first insulator 42 is opposed to the first surface F4A of the flexible conductor F4, the first insulator 22 is moved in the −Z direction and, together with the flexible conductor F4, pressed against the second insulator 43.

Figure 38:
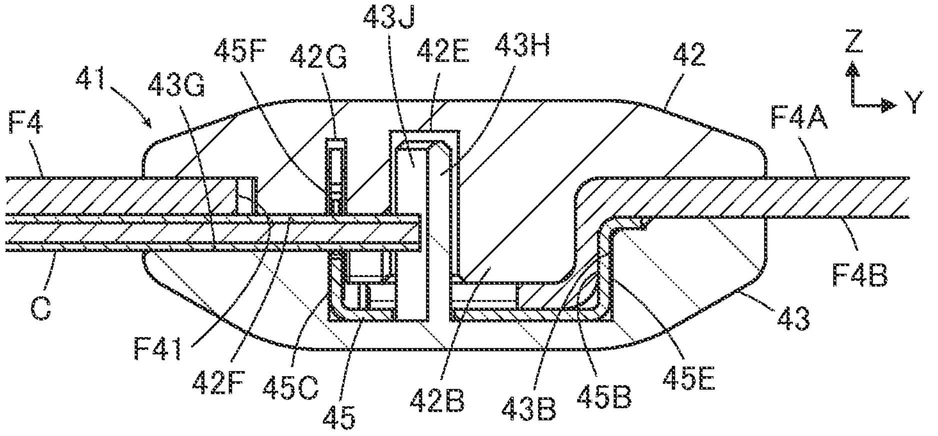
FIG. 38 is a cross-sectional side view showing the connector assembly according to Embodiment 4.
Figure 39:
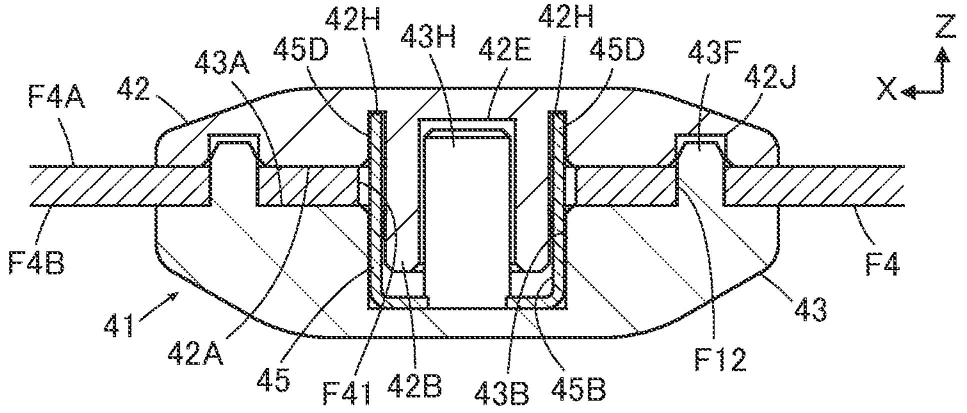
FIG. 39 is a cross-sectional front view showing the connector assembly according to Embodiment 4.

Thus, as shown in FIGS. 38 and 39, the projection 42B of the first insulator 42 is accommodated in the projection accommodating portion 45B of the contact 45 accommodated in the contact accommodating portion 43B of the second insulator 43 while pushing, in the −Z direction, a part of the flexible conductor F4 adjacent to the hole F41.

In addition, of the contact 45, a +Z directional end portion of the electric-wire connection piece 45C and the +Z directional end portion of the contact holding piece 45D which project to the +Z direction side of the flexible conductor F4 are respectively accommodated in the electric-wire-connection-piece accommodating portion 42G and the contact-holding-piece accommodating portion 42H of the first insulator 42.

At this time, the electric wire C disposed on the opening end portion 45G of the electric-wire connection piece 45C of the contact 45 is pushed into the electric-wire contact portion 45F composed of the slit of the electric-wire connection piece 45C by the electric-wire accommodating groove 42F of the first insulator 42 and is electrically connected to the contact 45.

In addition, the projection 42B of the first insulator 42 is accommodated in the projection accommodating portion 45B of the contact 45 while pushing the flexible conductor F4 in the −Z direction, whereby the flexible conductor F4 is sandwiched between an outer surface, facing in the +Y direction, of the projection 42B and the conductor contact piece 45E of the contact 45. In this manner, the flexible conductor F4 makes contact with the conductor contact piece 45E of the contact 45 with predetermined contact pressure and is electrically connected to the contact 45.

Consequently, the electric wire C extending on and along the second surface F4B of the flexible conductor F4 is electrically connected to the flexible conductor F4 via the contact 45.

Note that the +Z directional end portion of each of the pair of contact holding pieces 45D of the contact 45 is accommodated in the corresponding contact-holding-piece accommodating portion 42H of the first insulator 42 as shown in FIG. 39, and the third press-fitted portions 45K of each of the contact holding pieces 45D shown in FIG. 35 are press-fitted to an inner wall of the corresponding contact-holding-piece accommodating portion 42H, whereby the first insulator 42 is fixed to the contact 45.

In addition, as shown in FIG. 39, the two positioning pins 43F of the second insulator 43 are separately inserted into the two pin insertion holes 42J of the first insulator 42 through the two round holes F12 of the flexible conductor F4 so that the first insulator 42 and the second insulator 43 are aligned with the flexible conductor F4, and the flexible conductor F4 is held in the connector 41 by being sandwiched between the first holding surface 42A of the first insulator 42 and the second holding surface 43A of the second insulator 43.

With this configuration, the electric wire C can be electrically connected to the flexible conductor F4 by means of the small-sized connector 41 even when, of the four side wall portions S of the contact 45, the two side wall portions S facing each other in the Y direction and constituting the first side wall pair are separately formed from the electric-wire connection piece 45C and the conductor contact piece 45E while the two side wall portions S facing each other in the X direction and constituting the second side wall pair are each formed from the contact holding piece 45D.

Embodiment 5

In the contacts 15, 25, 35, 45 used in Embodiments 1 to 4, one of the four side wall portions S is formed from the electric-wire connection piece 15C, 25C, 35C, 45C, but the invention is not limited thereto, and two of the four side wall portions S may be each formed from an electric-wire connection piece.

Figure 40:
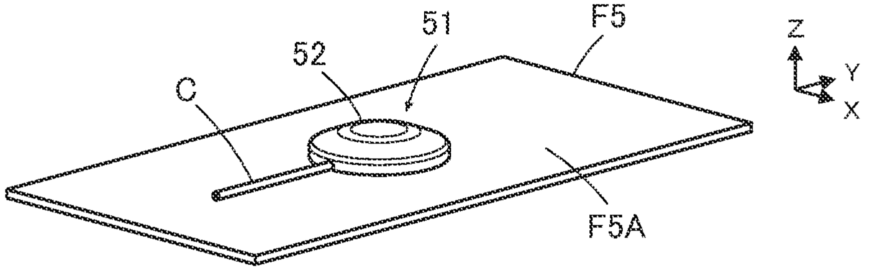
FIG. 40 is a perspective view showing a connector assembly according to Embodiment 5 when viewed from an obliquely upper position.
Figure 41:
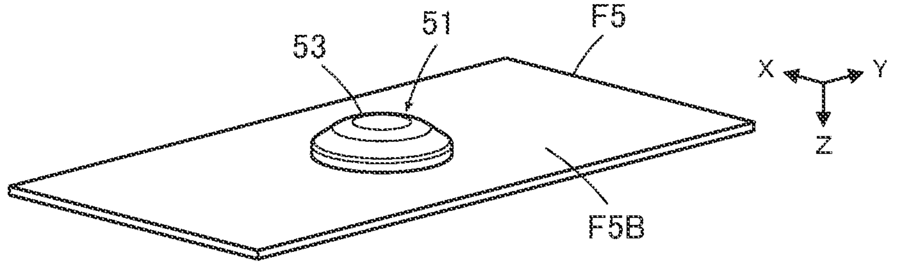
FIG. 41 is a perspective view showing the connector assembly according to Embodiment 5 when viewed from an obliquely lower position.

FIGS. 40 and 41 show a connector assembly according to Embodiment 5. This connector assembly is obtained by connecting an electric wire C to a flexible conductor F5 by means of a connector 51. The flexible conductor F5 includes a first surface F5A facing in the +Z direction and a second surface F5B facing in the −Z direction, and the electric wire C connected to the flexible conductor F5 extends on and along the first surface F5A of the flexible conductor F5.

The connector 51 includes a first insulator 52 disposed on the first surface F5A of the flexible conductor F5 and a second insulator 53 disposed on the second surface F5B of the flexible conductor F5.

Figure 42:
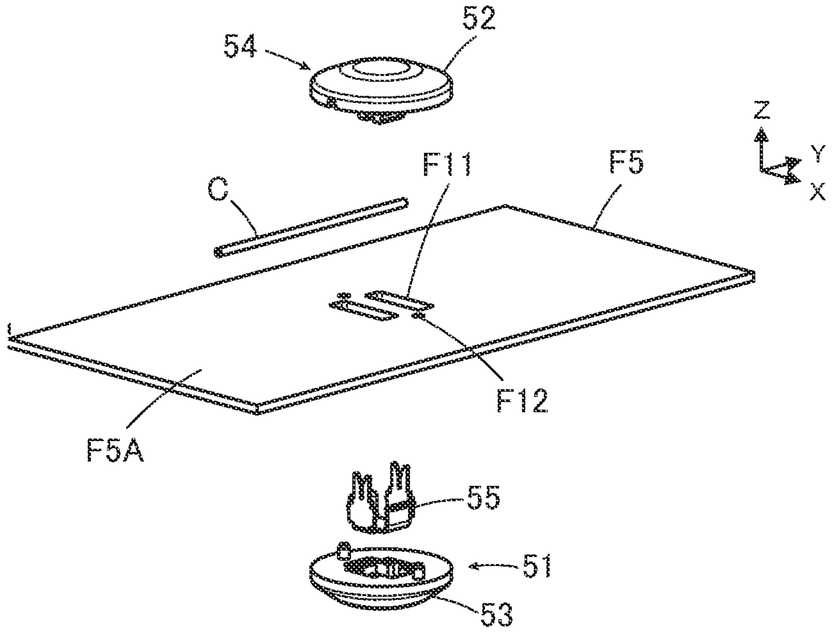
FIG. 42 is an assembly view of the connector assembly according to Embodiment 5.

FIG. 42 is an assembly view of the connector assembly according to Embodiment 5. The flexible conductor F5 has the same configuration as that of the flexible conductor F1 used in Embodiment 1.

The first insulator 52 and the second insulator 53 of the connector 51 are attached to each other to overlap in the Z direction with the flexible conductor F5 being sandwiched therebetween, thereby forming a housing 54. The connector 51 has a contact 55 accommodated in the housing 54.

The electric wire C is the same as the electric wires C used in Embodiments 1 to 4.

Figure 43:
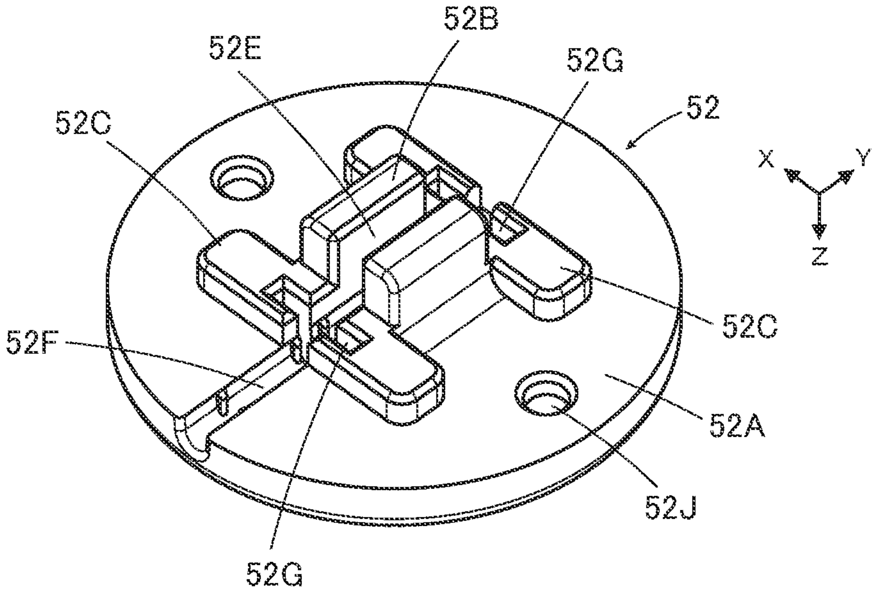
FIG. 43 is a perspective view showing a first insulator of a connector used in Embodiment 5.

As shown in FIG. 43, the first insulator 52 is made of an insulating material such as an insulating resin and includes a first holding surface 52A extending in a flat shape along an XY plane, a projection 52B of substantially quadrangular prism shape projecting in the −Z direction from a center portion of the first holding surface 52A, and a pair of protruding portions 52C separately formed to protrude on the first holding surface 52A at positions separately adjacent to the projection 52B on the −Y direction side and the +Y direction side thereof.

The projection 52B is provided with an electric-wire-end-portion accommodating portion 52E of groove shape extending in the Y direction and opening in the −Z direction such that the projection 52B is divided into two parts.

In addition, in the first holding surface 52A and the pair of protruding portions 52C, an electric-wire accommodating groove 52F extending in the Y direction and recessed in the +Z direction is formed to communicate with the electric-wire-end-portion accommodating portion 52E.

A width dimension in the X direction of at least part of the electric-wire-end-portion accommodating portion 52E and the electric-wire accommodating groove 52F is designed to be slightly smaller than the outside diameter of the electric wire C. With this configuration, when the connector assembly is assembled, the electric wire C is pushed into the electric-wire-end-portion accommodating portion 52E and the electric-wire accommodating groove 52F, a +Y directional end portion of the electric wire C and a part of the electric wire C continuing to the +Y directional end portion can be temporarily held in the electric-wire-end-portion accommodating portion 52E and the electric-wire accommodating groove 52F.

In addition, electric-wire-connection-piece accommodating portions 52G extending in the X direction and recessed in the +Z direction are separately formed in the pair of protruding portions 52C.

Further, in the first holding surface 52A, two pin insertion holes 52J recessed in the +Z direction are separately formed on opposite sides across the projection 52B in the X direction so as to sandwich the projection 52B.

Figure 44:
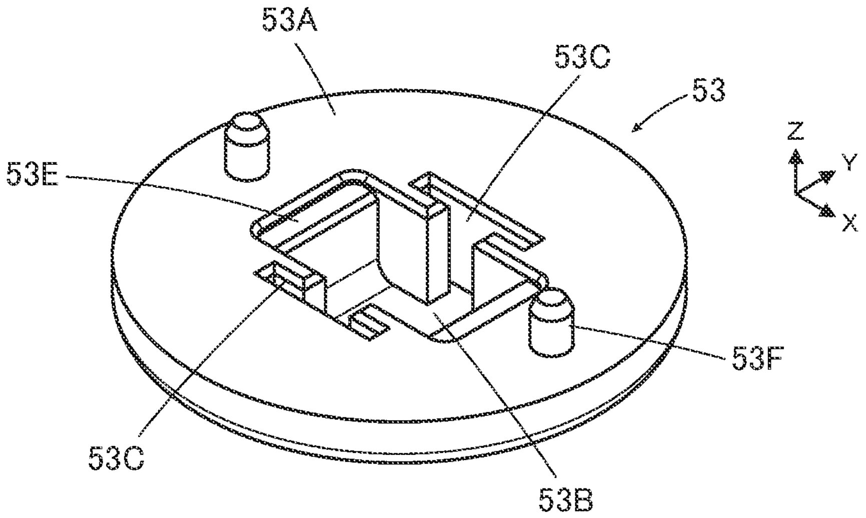
FIG. 44 is a perspective view showing a second insulator of the connector used in Embodiment 5.

As shown in FIG. 44, the second insulator 53 is made of an insulating material such as an insulating resin and includes a second holding surface 53A extending in a flat shape along an XY plane and a contact accommodating portion 53B of recess shape recessed in the −Z direction from a center portion of the second holding surface 53A. Electric-wire-connection-piece holding portions 53C extending in the X direction and recessed in the −Z direction are separately formed on the −Y direction side and the +Y direction side of the contact accommodating portion 53B. These electric-wire-connection-piece holding portions 53C communicate with the contact accommodating portion 53B.

In addition, flange accommodating portions 53E each having a step shape recessed in the −Z direction and communicating with the contact accommodating portion 53B are separately formed at parts of the second holding surface 53A separately situated on a −X directional end portion and a +X directional end portion of the contact accommodating portion 53B.

Further, on the second holding surface 53A, two positioning pins 53F projecting in the +Z direction are separately formed on opposite sides across the contact accommodating portion 53B in the X direction so as to sandwich the contact accommodating portion 53B.

Figure 45:
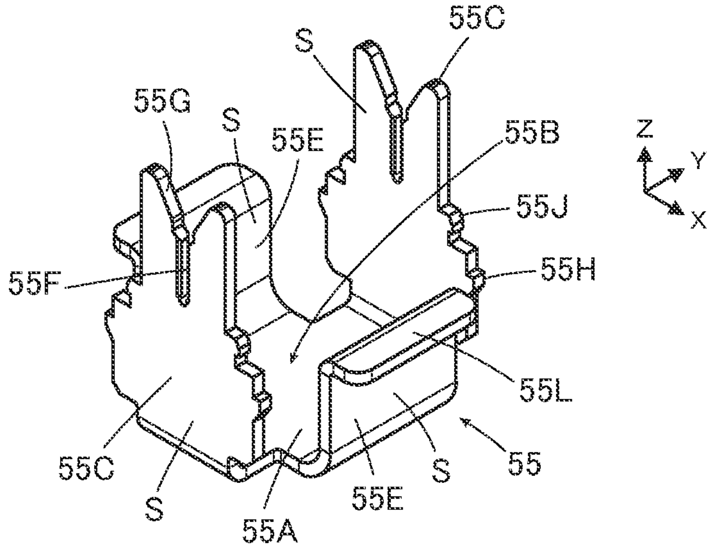
FIG. 45 is a perspective view showing a contact of the connector used in Embodiment 5.

As shown in FIG. 45, the contact 55 is formed of, for example, a single bent metal plate and includes a bottom plate portion 55A of rectangular shape, four side wall portions S extending in the +Z direction separately from four edge portions of the bottom plate portion 55A and separated from one another, and a projection accommodating portion 55B formed by being surrounded by the bottom plate portion 55A and the four side wall portions S.

Of the four side wall portions S, two side wall portions S facing each other in the Y direction and constituting a first side wall pair are each formed from an electric-wire connection piece 55C, and two side wall portions S facing each other in the X direction and constituting a second side wall pair are each formed from a conductor contact piece 55E.

The two electric-wire connection pieces 55C have the same configuration, and an electric-wire contact portion 55F composed of a slit extending in the Z direction is formed at a tip in the +Z direction of each of the electric-wire connection pieces 55C, and an opening end portion 55G having a taper shape opening in the +Z direction is formed at a +Z directional end portion of the slit.

First press-fitted portions 55H projecting in the X direction are separately formed at opposite edge portions in the X direction of a part near a −Z directional end portion of the electric-wire connection piece 55C, and fourth press-fitted portions 55J projecting in the X direction are separately formed at opposite edge portions in the X direction of a middle part in the Z direction of the electric-wire connection piece 55C. The fourth press-fitted portions 55J are situated on the −Z direction side of the electric-wire contact portion 55F and on the +Z direction side of the first press-fitted portions 55H.

A flange 55L extending out of the projection accommodating portion 55B and along an XY plane is formed at a +Z directional end portion of each of the conductor contact pieces 55E.

Figure 46:
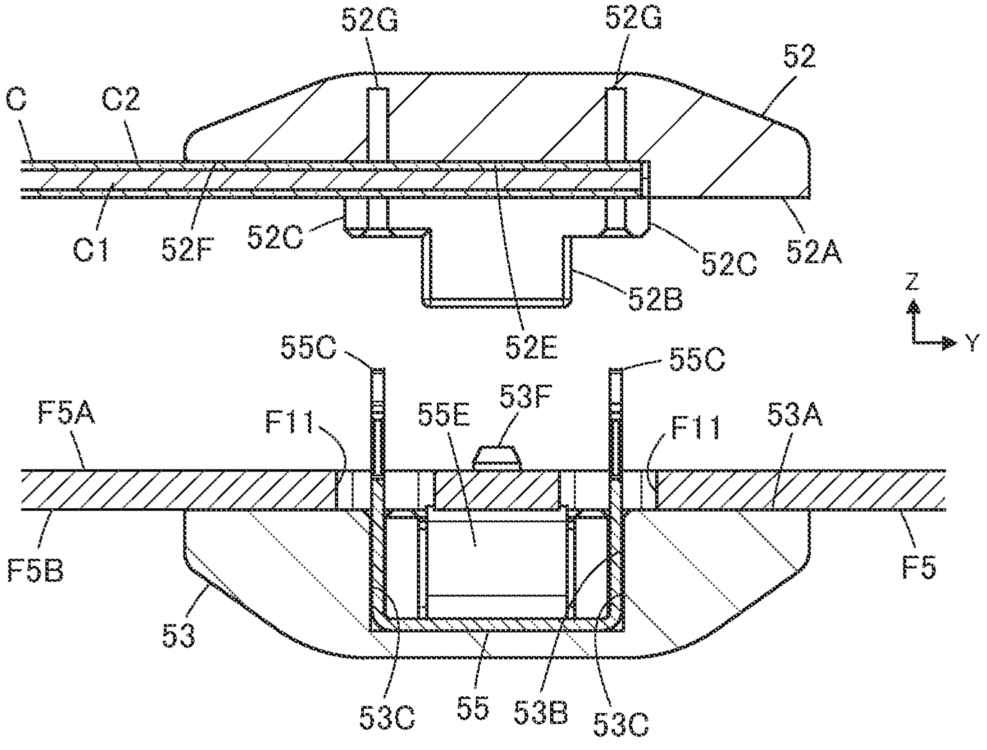
FIG. 46 is a cross-sectional side view of the connector assembly according to Embodiment 5 in the process of assembling.

Here, the method of assembling the connector assembly according to Embodiment 5 is described. First, as shown in FIG. 46, the contact 55 is accommodated in the contact accommodating portion 53B of the second insulator 53, and the flexible conductor F5 is positioned above the second holding surface 53A of the second insulator 53.

At this time, the two electric-wire connection pieces 55C of the contact 55 are separately pushed into the corresponding electric-wire-connection-piece holding portions 53C of the second insulator 53, and the first press-fitted portions 55H of each of the electric-wire connection pieces 55C shown in FIG. 45 are press-fitted to an inner wall of the corresponding electric-wire-connection-piece holding portion 53C, whereby the contact 55 is fixed to the contact accommodating portion 53B of the second insulator 53.

While the conductor contact piece 55E of the contact 55 has a Z direction height corresponding to a Z direction depth of the contact accommodating portion 53B of the second insulator 53, since the electric-wire connection piece 55C extends longer than the conductor contact piece 55E in the +Z direction, the two electric-wire connection pieces 55C of the contact 55 accommodated in the contact accommodating portion 53B project in the +Z direction from the second holding surface 53A of the second insulator 53 and project to the +Z direction side of the flexible conductor F5 through the two long holes F11 of the flexible conductor F5.

In addition, the +Y directional end portion of the electric wire C is pushed into the electric-wire-end-portion accommodating portion 52E and the electric-wire accommodating groove 52F of the first insulator 52, whereby the electric wire C is temporarily held in the first insulator 52.

In this state, while the first holding surface 52A of the first insulator 52 is opposed to the first surface F5A of the flexible conductor F5, the first insulator 52 is moved in the −Z direction and pressed against the flexible conductor F5 and the second insulator 53.

Figure 47:
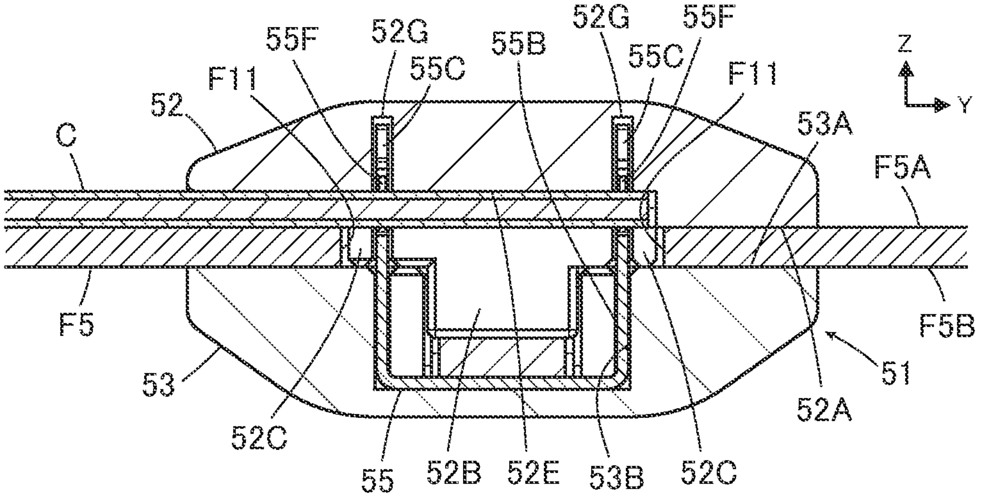
FIG. 47 is a cross-sectional side view showing the connector assembly according to Embodiment 5.

Thus, as shown in FIG. 47, the two protruding portions 52C of the first insulator 52 are separately inserted into the two long holes F11 of the flexible conductor F5, and the projection 52B of the first insulator 52 is accommodated in the projection accommodating portion 55B of the contact 55 accommodated in the contact accommodating portion 53B of the second insulator 53 while pushing, in the −Z direction, a part of the flexible conductor F5 situated between the two long holes F11.

In addition, of the contact 55, +Z directional end portions of the two electric-wire connection pieces 55C which project to the +Z direction side of the flexible conductor F5 are separately accommodated in the corresponding electric-wire-connection-piece accommodating portions 52G of the first insulator 52.

Figure 48:
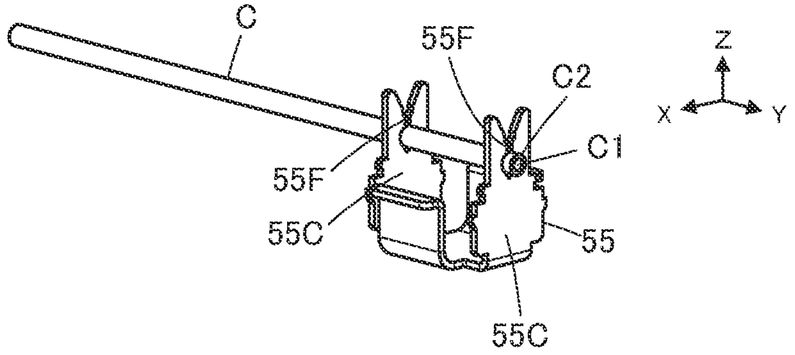
FIG. 48 is a perspective view showing an electric wire connected to the contact of the connector assembly according to Embodiment 5.

At this time, the electric wire C temporarily held in the first insulator 52 is pushed into the electric-wire contact portions 55F separately composed of the slits of the two electric-wire connection pieces 55C of the contact 55 as shown in FIG. 48 and makes contact with the two electric-wire contact portions 55F, whereby the electric wire C is electrically connected to the contact 55.

Figure 49:
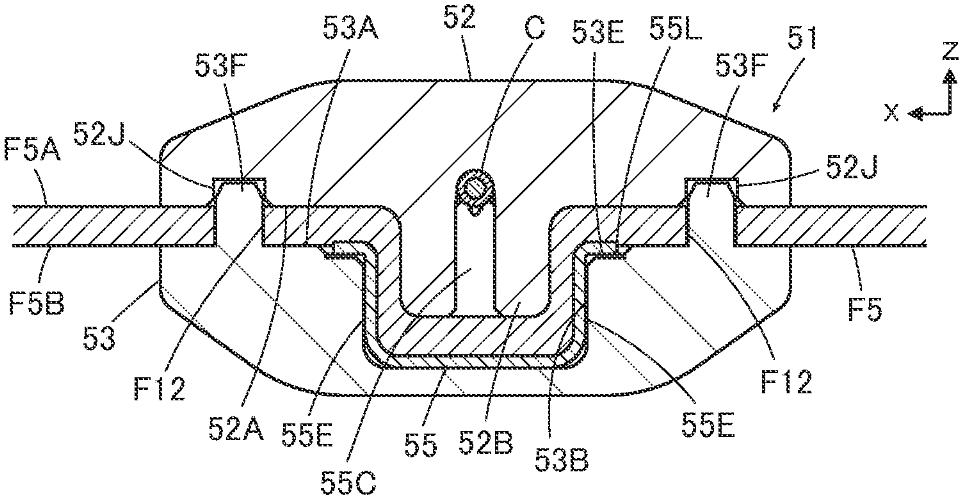
FIG. 49 is a cross-sectional front view showing the connector assembly according to Embodiment 5.

In addition, the projection 52B of the first insulator 52 is accommodated in the projection accommodating portion 55B of the contact 55 while pushing the flexible conductor F5 in the −Z direction, whereby the flexible conductor F5 is sandwiched between each of outer surfaces, separately facing in the −X direction and the +X direction, of the projection 52B and each of the pair of conductor contact pieces 55E of the contact 55 as shown in FIG. 49. In this manner, the flexible conductor F5 makes contact with the conductor contact pieces 55E of the contact 55 with predetermined contact pressure and is electrically connected to the contact 55.

Consequently, the electric wire C is electrically connected to the flexible conductor F5 via the contact 55.

Note that the +Z directional end portions of the two electric-wire connection pieces 55C of the contact 55 are separately accommodated in the corresponding electric-wire-connection-piece accommodating portions 52G of the first insulator 52, and the fourth press-fitted portions 55J of each of the electric-wire connection pieces 55C shown in FIG. 45 are press-fitted to an inner wall of the corresponding electric-wire-connection-piece accommodating portion 52G, whereby the first insulator 52 is fixed to the contact 55.

As shown in FIG. 49, the two positioning pins 53F of the second insulator 53 are separately inserted into the two pin insertion holes 52J of the first insulator 52 through the two round holes F12 of the flexible conductor F5 so that the first insulator 52 and the second insulator 53 are aligned with the flexible conductor F5, and the flexible conductor F5 is held in the connector 51 by being sandwiched between the first holding surface 52A of the first insulator 52 and the second holding surface 53A of the second insulator 53.

Note that the flanges 55L of the contact 55 are separately accommodated in the flange accommodating portions 53E of the second insulator 53.

As shown in FIG. 47, the electric-wire-end-portion accommodating portion 52E accommodating the +Y directional end portion of the electric wire C is disposed in the projection 52B accommodated in the projection accommodating portion 55B of the contact 55, of the first insulator 52, and the electric-wire contact portions 55F of the contact 55 are connected to the electric wire C at a position where the electric-wire contact portions 55F overlap the flexible conductor F5 in the Z direction, thereby achieving the small-sized connector 51 capable of connecting the electric wire C to the flexible conductor F5.

In addition, since the contact 55 in Embodiment 5 includes the two electric-wire connection pieces 55C and the electric wire C makes contact with the electric-wire contact portions 55F separately composed of the slits of the two electric-wire connection pieces 55C, the reliability of electric connection between the electric wire C and the contact 55 is improved, and consequently, the electric wire C can be connected to the flexible conductor F5 with high reliability.

Also in the contact 55 in Embodiment 5, as with the contact 35 in Embodiment 3 above, when a blade portion sharply pointed in the +Z direction is formed at the +Z directional end portion of each of the two electric-wire connection pieces 55C, even when the flexible conductor F5 does not include any opening portion such as a through-hole, the blade portion of each of the two electric-wire connection pieces 55C tears the flexible conductor F5, and the electric wire C can be connected to the flexible conductor F5 by the connector 51.

Embodiment 6

As shown in FIG. 6, in the contact 15 used in Embodiment 1, the four side wall portions S separately formed from one electric-wire connection piece 15C, one contact holding piece 15D and two conductor contact pieces 15E extend in the +Z direction separately from the four edge portions of the bottom plate portion 15A of rectangular shape and are separated from one another, but the invention is not limited thereto.

Figure 50:
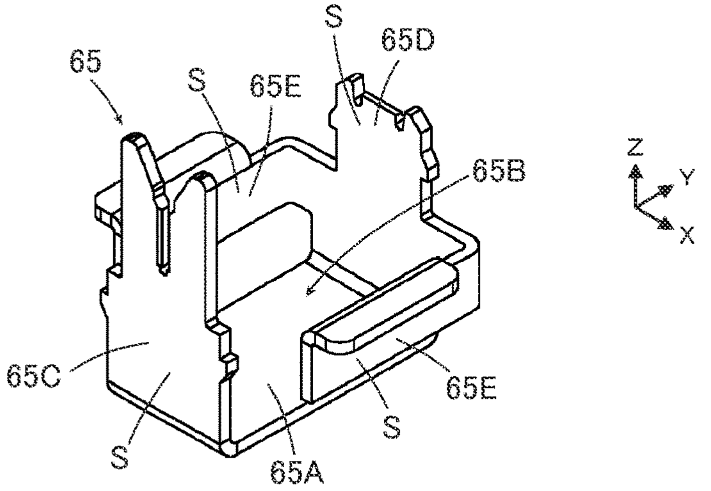
FIG. 50 is a perspective view showing a contact of a connector used in Embodiment 6.

As shown in FIG. 50, a contact 65 in Embodiment 6 includes a bottom plate portion 65A of rectangular shape extending along an XY plane, an electric-wire connection piece 65C extends in the +Z direction along an XZ plane from a −Y directional edge portion of the bottom plate portion 65A, and a contact holding piece 65D extends in the +Z direction along an XZ plane from a +Y directional edge portion of the bottom plate portion 65A. Further, conductor contact pieces 65E extend in the −Y direction along a YZ plane separately from a −X directional end portion and a +X directional end portion of the contact holding piece 65D. The two conductor contact pieces 65E are not joined to the bottom plate portion 65A and the electric-wire connection piece 65C and a gap is formed between each of the conductor contact pieces 65 and each of the bottom plate portion 65A and the electric-wire connection piece 65C.

One electric-wire connection piece 65C, one contact holding piece 65D and the two conductor contact pieces 65E separately form four side wall portions S extending in the +Z direction, and the bottom plate portion 65A and the four side wall portions S form a projection accommodating portion 65B recessed in the −Z direction.

Even when the contact 65 shown in FIG. 50 is used instead of the contact 15, 25 in Embodiment 1 or 2, the electric wire C can be connected to the flexible conductor F1, F2.

Also in Embodiment 3, similarly, instead of the conductor contact pieces 35E extending in the +Z direction separately from a −X directional edge portion and a +X directional edge portion of the bottom plate portion 35A of the contact 35 shown in FIG. 25, the conductor contact pieces 35E may extend in the −Y direction along a YZ plane separately from a −X directional end portion and a +X directional end portion of the contact holding piece 35D.

Further, also in Embodiment 4, instead of the contact holding pieces 45D extending in the +Z direction separately from a −X directional edge portion and a +X directional edge portion of the bottom plate portion 45A of the contact 45 shown in FIG. 35, the contact holding pieces 45D may extend in the −Y direction along a YZ plane separately from a −X directional end portion and a +X directional end portion of the conductor contact piece 45E.

Further, also in Embodiment 5, instead of the conductor contact pieces 55E extending in the +Z direction separately from a −X directional edge portion and a +X directional edge portion of the bottom plate portion 55A of the contact 55 shown in FIG. 45, the conductor contact pieces 55E may extend in the −Y direction along a YZ plane separately from a −X directional end portion and a +X directional end portion of one of the two electric-wire connection pieces 55C, which one is situated on the +Y direction side, for example.

Embodiment 7

As shown in FIG. 6, the contact 15 used in Embodiment 1 includes the bottom plate portion 15A of rectangular shape and the four side wall portions S extending in the +Z direction separately from the four edge portions of the bottom plate portion 15A and separated from one another, but the invention is not limited thereto.

Figure 51:
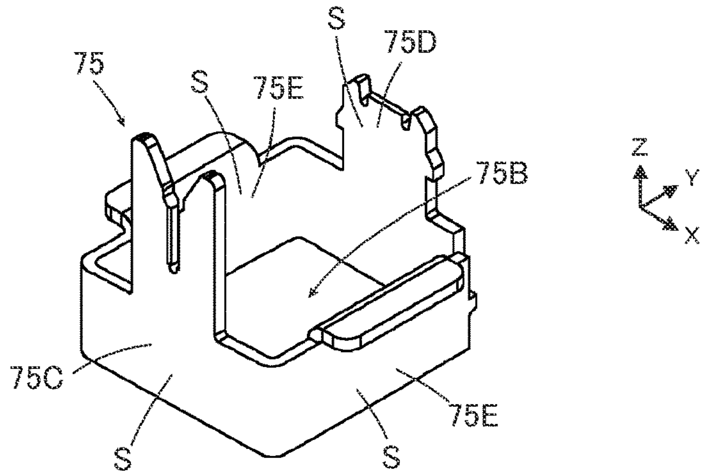
FIG. 51 is a perspective view showing a contact of a connector used in Embodiment 7.
Figure 52:
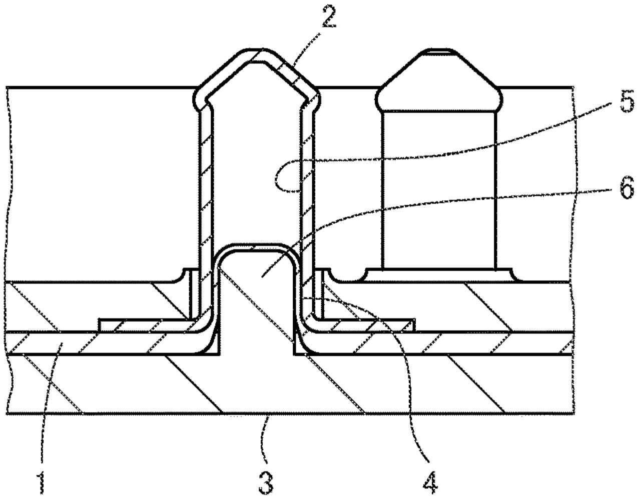
FIG. 52 PRIOR ART
FIG. 52 is a cross-sectional view showing a contact, a projection, and a flexible substrate in a conventional connector.

As shown in FIG. 51, a contact 75 in Embodiment 7 includes one electric-wire connection piece 75C extending along an XZ plane, two conductor contact pieces 75E extending in the +Y direction along a YZ plane separately from a −X directional end portion and a +X directional end portion of the electric-wire connection piece 75C, and one contact holding piece 75D extending in the +X direction along an XZ plane from a +Y directional end portion of the conductor contact piece 75E, of the two conductor contact pieces 75E, situated on the −X direction side.

Note that a +Y directional end portion of the conductor contact piece 75E, of the two conductor contact pieces 75E, situated on the +X direction side is not joined to the contact holding piece 75D, and a gap is formed between the conductor contact piece 75E and the contact holding piece 75D.

While the contact 75 does not include a bottom plate portion extending along an XY plane, the one electric-wire connection piece 75C, the two conductor contact pieces 75E and the one contact holding piece 75D separately form the four side wall portions S extending in the +Z direction, and these four side wall portions S form a projection accommodating portion 75B recessed in the −Z direction.

Even when the contact 75 shown in FIG. 51 is used instead of the contact 15, 25 in Embodiment 1 or 2, the electric wire C can be connected to the flexible conductor F1, F2.

Also in Embodiment 3, similarly, the bottom plate portion 35A of the contact 35 shown in FIG. 25 may be omitted, two conductor contact pieces 35E may extend in the +Y direction along a YZ plane separately from a −X directional end portion and a +X directional end portion of the electric-wire connection piece 35C, and one contact holding piece 35D may extend in the +X direction along an XZ plane from a +Y directional end portion of the conductor contact piece 35E, of the two conductor contact pieces 35E, situated on the −X direction side.

Further, also in Embodiment 4, the bottom plate portion 45A of the contact 45 shown in FIG. 35 may be omitted, two contact holding pieces 45D may extend in the +Y direction along a YZ plane separately from a −X directional end portion and a +X directional end portion of the electric-wire connection piece 45C, and one conductor contact piece 45E may extend in the +X direction along an XZ plane from a +Y directional end portion of the contact holding piece 45D, of the two contact holding pieces 45D, situated on the −X direction side.

In addition, also in Embodiment 5, the bottom plate portion 55A of the contact 55 shown in FIG. 45 may be omitted, two conductor contact pieces 55E may extend in the +Y direction along a YZ plane separately from a −X directional end portion and a +X directional end portion of the electric-wire connection piece 55C, of the two electric-wire connection pieces 55C, situated on the −Y direction side, and the other electric-wire connection piece 55C may extend in the +X direction along an XZ plane from a +Y directional end portion of the conductor contact piece 55E, of the two conductor contact pieces 55E, situated on the −X direction side.

In Embodiments 1 to 5 above, in order to improve waterproof properties of the connector 11, 21, 31, 41, 51 and a holding force of the connector 11, 21, 31, 41, 51 to hold the flexible conductor F1, F2, F3, F4, F5, an adhesive may be used to adhere between the first holding surface 12A, 22A, 32A, 42A, 52A of the first insulator 12, 22, 32, 42, 52 and the first surface F1A, F2A, F3A, F4A, F5A of the flexible conductor F1, F2, F3, F4, F5 and between the second holding surface 13A, 23A, 33A, 43A, 53A of the second insulator 13, 23, 33, 43, 53 and the second surface F1B, F2B, F3B, F4B, F5B of the flexible conductor F1, F2, F3, F4, F5.

In Embodiments 1 to 5, the flexible conductor F1, F2, F3, F4, F5 is manufactured by twisting conductive fibers, but the invention is not limited thereto, and the flexible conductor may be formed from a conductive paste applied onto a surface of a sheet-like base having insulating properties by printing or another method. Such a flexible conductor may be formed on one surface or both surfaces of a sheet-like base.

When a flexible conductor is formed on only one surface of a sheet-like base, the first insulator 12, 22, 32, 42, 52 is disposed on the sheet-like base side, while the second insulator 13, 23, 33, 43, 53 is disposed on the flexible conductor side, whereby the flexible conductor can be electrically connected to the conductor contact piece 15E, 25E, 35E, 45E, 55E of the contact 15, 25, 35, 45, 55.

What is claimed is:

1. A connector for connecting an electric wire to a flexible conductor having a sheet-like shape and including a first surface and a second surface facing in opposite directions to each other, the connector comprising:

- a housing which is attached to the flexible conductor and holds an end portion of the electric wire; and
- a contact which is made of a conductive material and accommodated in the housing, the housing including:
- a first insulator which is disposed on the first surface of the flexible conductor; and
- a second insulator which is disposed on the second surface of the flexible conductor and attached to the first insulator along a first direction which is a thickness direction of the flexible conductor,
- wherein the first insulator includes a projection projecting in the first direction toward the second insulator, the projection including an electric-wire-end-portion accommodating portion opening in a second direction intersecting the first direction,
- wherein the second insulator includes a contact accommodating portion which is recessed in the first direction and accommodates the contact,
- wherein the contact includes a plurality of side wall portions extending in the first direction, and a projection accommodating portion which is surrounded by the plurality of side wall portions and recessed in the first direction,
- wherein the plurality of side wall portions include at least one side wall portion formed from an electric-wire connection piece having at a tip thereof in the first direction an electric-wire contact portion which makes contact with the electric wire, and at least one side wall portion formed from a conductor contact piece which makes contact with the flexible conductor, wherein the contact is accommodated in the contact accommodating portion, the end portion of the electric wire is accommodated in the electric-wire-end-portion accommodating portion of the projection, and the projection is accommodated in the projection accommodating portion of the contact such that the flexible conductor is sandwiched therebetween and that the electric-wire-end-portion accommodating portion opening in the second direction is opposed to the electric-wire connection piece, and wherein the electric wire extends in the second direction from the electric-wire-end-portion accommodating portion and makes contact with the electric-wire contact portion of the electric-wire connection piece of the contact, and a part of the flexible conductor is sandwiched between an outer surface of the projection and the conductor contact piece of the contact and makes contact with the conductor contact piece of the contact, whereby the electric wire is electrically connected to the flexible conductor via the contact.

2. The connector according to claim 1, wherein the first insulator includes a first holding surface which is disposed around the projection so as to surround the projection and is opposed to the first surface of the flexible conductor, wherein the second insulator includes a second holding surface which is disposed around the contact accommodating portion so as to surround the contact accommodating portion and is opposed to the second surface of the flexible conductor, and wherein the flexible conductor is held to the housing by being sandwiched between the first holding surface of the first insulator and the second holding surface of the second insulator.

3. The connector according to claim 1, wherein the electric-wire contact portion is composed of a slit which is disposed at a tip of the electric-wire connection piece and extends in the first direction, and wherein the electric wire is inserted in the slit, whereby the electric-wire connection piece makes contact with the electric wire.

4. The connector according to claim 1, wherein at least part of the electric-wire-end-portion accommodating portion has a width dimension slightly smaller than an outside diameter of the electric wire in a direction orthogonally intersecting the second direction.

5. The connector according to claim 1, wherein the contact includes a bottom plate portion of rectangular shape, and wherein the projection accommodating portion is surrounded by the bottom plate portion and the plurality of side wall portions.

6. The connector according to claim 1, wherein the contact includes two of the plurality of side wall portions which constitute a first side wall pair facing each other in the second direction, and an other two of the plurality of side wall portions which constitute a second side wall pair facing each other in a third direction intersecting the first direction.

7. The connector according to claim 6, wherein one of the two of the plurality of side wall portions which constitute the first side wall pair is formed from the electric-wire connection piece, and wherein each of the other two of the plurality of side wall portions which constitute the second side wall pair is formed from the conductor contact piece.

8. The connector according to claim 7, wherein another one of the two of the plurality of side wall portions which constitute the first side wall pair is formed from a contact holding piece for fixing the contact to the first insulator and the second insulator.

9. The connector according to claim 6, wherein the two of the plurality of side wall portions which constitute the first side wall pair are separately formed from the electric-wire connection piece and the conductor contact piece, and wherein each of the other two of the plurality of side wall portions which constitute the second side wall pair is formed from a contact holding piece for fixing the contact to the first insulator and the second insulator.

10. The connector according to claim 8, wherein the first insulator includes an electric-wire-connection-piece accommodating portion of recess shape accommodating a tip of the electric-wire connection piece, and a contact-holding-piece accommodating portion of recess shape accommodating a tip of the contact holding piece.

11. The connector according to claim 10, wherein the second insulator includes an electric-wire-connection-piece holding portion of recess shape communicating with the contact accommodating portion and holding the electric-wire connection piece, and a contact-holding-piece holding portion of recess shape communicating with the contact accommodating portion and holding the contact holding piece.

12. The connector according to claim 11, wherein the electric-wire connection piece includes a first press-fitted portion which is press-fitted to the electric-wire-connection-piece holding portion of the second insulator, and wherein the contact holding piece includes a second press-fitted portion which is press-fitted to the contact-holding-piece holding portion of the second insulator, and a third press-fitted portion which is press-fitted to the contact-holding-piece accommodating portion of the first insulator.

13. The connector according to claim 10, wherein a tip of the electric-wire connection piece and a tip of the contact holding piece of the contact pass through an opening portion which is formed in advance in the flexible conductor and are respectively accommodated in the electric-wire-connection-piece accommodating portion and the contact-holding-piece accommodating portion of the first insulator.

14. The connector according to claim 10, wherein each of a tip of the electric-wire connection piece and a tip of the contact holding piece of the contact has a blade portion which tears the flexible conductor.

15. The connector according to claim 6, wherein each of the two of the plurality of side wall portions which constitute the first side wall pair is formed from the electric-wire connection piece, and wherein each of the other two of the plurality of side wall portions which constitute the second side wall pair is formed from the conductor contact piece.

16. The connector according to claim 15, wherein the first insulator includes two electric-wire-connection-piece accommodating portions of recess shape each accommodating a tip of the electric-wire connection piece.

17. The connector according to claim 16, wherein the second insulator includes two electric-wire-connection-piece holding portions of recess shape communicating with the contact accommodating portion and each holding the electric-wire connection piece.

18. The connector according to claim 17, wherein the electric-wire connection piece includes a first press-fitted portion which is press-fitted to the electric-wire-connection-piece holding portion of the second insulator, and a fourth press-fitted portion which is press-fitted to the electric-wire-connection-piece accommodating portion of the first insulator.

19. The connector according to claim 16, wherein a tip of the electric-wire connection piece of the contact passes through an opening portion which is formed in advance in the flexible conductor and is accommodated in the electric-wire-connection-piece accommodating portion of the first insulator.

20. The connector according to claim 16, wherein each of a tip of the electric-wire connection piece and a tip of the contact holding piece of the contact has a blade portion which tears the flexible conductor.

21. The connector according to claim 1, wherein the contact has a flange which is disposed on a tip in the first direction of the conductor contact piece and extends out of the projection accommodating portion, and wherein the second insulator has a flange accommodating portion of step shape communicating with the contact accommodating portion and accommodating the flange.

22. The connector according to claim 1, wherein the electric wire is disposed on the first surface of the flexible conductor.

23. The connector according to claim 1, wherein the electric wire is disposed on the second surface of the flexible conductor.

24. A connector assembly comprising:

the flexible conductor;

the connector according to claim 1 which is attached to the flexible conductor; and the electric wire which is electrically connected to the flexible conductor via the contact by means of the connector.

25. The connector assembly according to claim 24, wherein when viewed in the first direction, the electric-wire contact portion of the contact is disposed at a position where the electric-wire contact portion overlaps the flexible conductor.

26. The connector assembly according to claim 24, wherein the flexible conductor has a pad shape.

27. The connector assembly according to claim 24, wherein the electric wire is a covered electric wire in which a conductor portion is covered with an insulating portion, and wherein the electric-wire contact portion of the contact makes contact with the conductor portion.

28. The connector assembly according to claim 27, wherein an end portion of the electric wire is accommodated in the electric-wire-end-portion accommodating portion of the projection of the first insulator in a state where the conductor portion is covered with the insulating portion.

* * * * *